United States Patent
Grund et al.

(10) Patent No.: US 10,190,255 B2
(45) Date of Patent: Jan. 29, 2019

(54) MIXTURES OF FIBER-REACTIVE AZO DYES, THEIR PREPARATION AND THEIR USE

(71) Applicant: DyStar Colours Distribution GmbH, Raunheim (DE)

(72) Inventors: Clemens Grund, Hattersheim (DE); Adrian Murgatroyd, Frankfurt (DE); Ulrich Hanxleden, Kelkheim (DE); Manfred Hoppe, Kürten (DE); Ulrich Weingarten, Ludwigshafen (DE); Ronald Pedemonte, Wesley Chapel, NC (US); Antonio Lopez-Torrentera, Charlotte, NC (US)

(73) Assignee: DyStar Colours Distribution GmbH (DE)

( * ) Notice: Subject to any disclaimer, the term of this patent is extended or adjusted under 35 U.S.C. 154(b) by 675 days.

(21) Appl. No.: 14/438,016

(22) PCT Filed: Oct. 24, 2013

(86) PCT No.: PCT/EP2013/003210
§ 371 (c)(1),
(2) Date: Apr. 23, 2015

(87) PCT Pub. No.: WO2014/063824
PCT Pub. Date: May 1, 2014

(65) Prior Publication Data
US 2015/0267345 A1    Sep. 24, 2015

(30) Foreign Application Priority Data

Oct. 25, 2012 (EP) ..................................... 12189853
Oct. 25, 2012 (EP) ..................................... 12189854

(51) Int. Cl.
*C09B 67/00* (2006.01)
*D06P 3/00* (2006.01)
(Continued)

(52) U.S. Cl.
CPC .......... *D06P 3/001* (2013.01); *C09B 67/0055* (2013.01); *C09D 11/328* (2013.01)

(58) Field of Classification Search
CPC .... C09D 11/328; D06P 3/001; C09B 67/0055
(Continued)

(56) References Cited

U.S. PATENT DOCUMENTS 2,657,205 A    10/1953 Heyna et al.
4,257,770 A    3/1981 Nishimura et al.
(Continued)

FOREIGN PATENT DOCUMENTS

CN    1730565 A    2/2006
DE    196 00 765 A1    7/1997
(Continued)

OTHER PUBLICATIONS

U.S. Appl. No. 14/435,052, filed Apr. 23, 2015, Grund et al.
International Search Report for PCT/EP2013/003210 mailed Dec. 18, 2013.

*Primary Examiner* — Eisa Elhilo
(74) *Attorney, Agent, or Firm* — Drinker Biddle & Reath LLP

(57) ABSTRACT

The present invention relates to dye mixtures comprising one or more dye(s) of: formula (I)

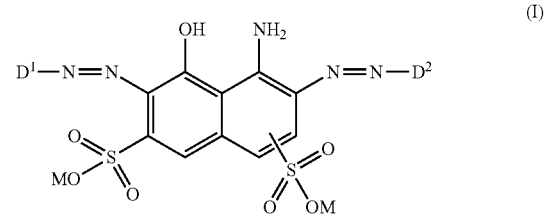

and
one or more dye(s) of: formula (II) and/or formula (III)

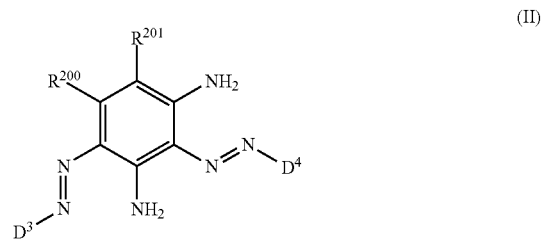

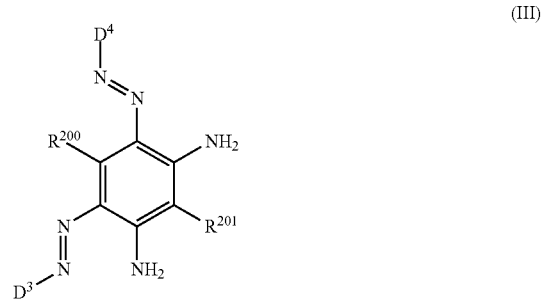

and optionally
one or more dye(s) of: formula (IV)
(Continued)

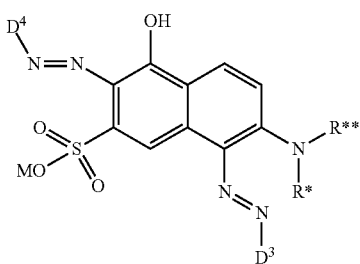

(IV)

to processes for their preparation and to their use for dyeing and printing hydroxyl- and carboxamido-containing materials.

8 Claims, No Drawings

(51) Int. Cl.
*C09D 11/328* (2014.01)
*C09B 67/22* (2006.01)

(58) Field of Classification Search
USPC .............................................. 8/641
See application file for complete search history.

(56) References Cited

U.S. PATENT DOCUMENTS

| 5,445,654 A | 8/1995 | Hussong et al. |
| 5,611,821 A | 3/1997 | Huang et al. |
| 5,849,887 A | 12/1998 | Lehmann et al. |
| 6,011,140 A | 1/2000 | Zamponi et al. |
| 6,160,101 A | 12/2000 | Tzikas et al. |
| 2006/0191082 A1 | 8/2006 | Tzikas et al. |

FOREIGN PATENT DOCUMENTS

| EP | 0 870 807 A1 | 10/1998 |
| EP | 1 035 171 A1 | 9/2000 |
| EP | 1 669 415 A1 | 6/2006 |
| EP | 1713865 A1 | 10/2006 |
| EP | 2 376 578 A2 | 10/2011 |
| JP | S58160362 A | 9/1983 |
| JP | 2008060017 A | 3/2008 |
| KR | 940002560 B1 | 3/1994 |
| WO | WO-2004/069937 A1 | 8/2004 |
| WO | WO 2005/080508 | 9/2005 |
| WO | WO 2010/066570 | 6/2010 |

MIXTURES OF FIBER-REACTIVE AZO DYES, THEIR PREPARATION AND THEIR USE

CROSS-REFERENCE TO RELATED APPLICATIONS

This application is a national stage application (under 35 U.S.C § 371) of PCT/EP 2013/003210, filed Oct. 24, 2013, which claims benefit of European Application No. 12189854.8, filed Oct. 25, 2012, and European Application No. 12189853.0, filed Oct. 25, 2012, all of which are incorporated herein by reference in their entirety.

The invention is related to the technical field of fiber-reactive azo dyes.

Mixed fiber-reactive azo dyes and their use for dyeing hydroxyl- and carboxamido-containing material in black shades are known for example from documents U.S. Pat. Nos. 5,445,654, 5,611,821, KR 94-2560, Sho 58-160362, EP 0 870 807 A1 and WO 2004/069937.

These dye mixtures, however, possess certain performance defects, such as an overly great dependence of the color yield on varying dyeing parameters in the dyeing operation or an inadequate or unlevel buildup of color on cotton (effective color buildup results from the ability of a dye to produce a proportionally stronger dyeing from a higher concentration in the dyebath). Consequences of these deficiencies may include, for example, poor reproducibility of the dyeings obtainable, which ultimately affects the economics of the dyeing operation. As a result of this there continues to be a need for new reactive dyes and reactive-dye mixtures having improved properties, such as high substantivity combined with the ability for unfixed fractions to be easily washed off and low propensity for staining adjacent fabric, particularly adjacent fabric of polyamide. Furthermore the dyes and dye mixtures shall exhibit good dyeing yields and possess a high reactivity, a particular intention being to yield dyeings having high degrees of fixation.

Surprisingly dye mixtures have now been found, which dye mixtures possess these above-described properties to a high extent. The dye mixtures of the present invention are notable in particular for high fixing yields and color strengths in combination with fractions not fixed on the fiber that are easy to wash off, and with a low level of polyamide staining. The high color strength in particular is worth mentioning since it offers an advantage from an environmental point of view by saving high volume packaging and reduces the carbon footprint when transporting the product. In addition the dyeings exhibit good all-round fastness properties, such as high lightfastness and very good wetfastness properties. Another advantage of the inventive dye mixture is a high tolerance of the color strength to temperature shifts during the dyeing process, which helps to avoid waste or additional dyeings because the dyed products are off spec.

The present invention thus is directed to a dye mixture comprising
one or more dye(s) of: formula (I)

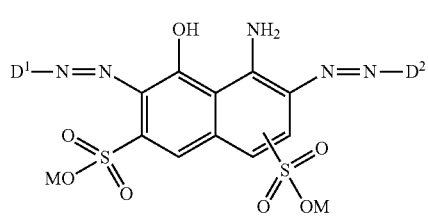

and
one or more dye(s) of: formula (II) and/or formula (III)

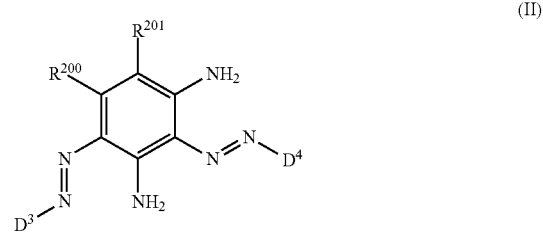

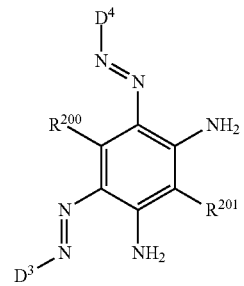

and optionally
one or more dye(s) of: formula (IV)

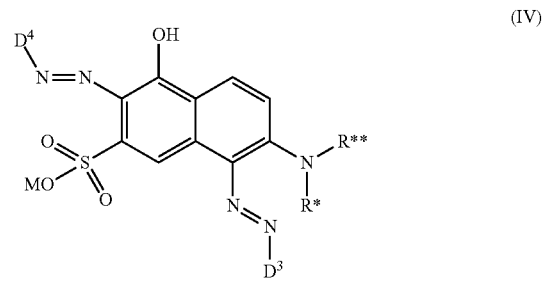

wherein
$D^1$ and $D^2$ independent of one another is group of formula (1)

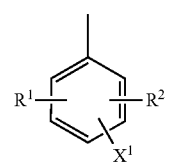

wherein
$R^1$ and $R^2$ independent of one another is hydrogen, $(C_1$-$C_4)$-alkyl, $(C_1$-$C_4)$-alkoxy, sulfa, carboxyl, amido or ureido,
$X^1$ is hydrogen or $-SO_2-CH=CH_2$,
$D^3$ and $D^4$ independent of one another is a group of formula (1)
wherein
$R^1$ and $R^2$ independent of one another is hydrogen, $(C_1$-$C_4)$-alkyl, $(C_1$-$C_4)$-alkoxy, sulfo, carboxyl, amido or ureido,
$X^1$ is hydrogen or a group of the formula: $-SO_2-Z$, wherein Z is hydroxyl, —CH=CH$_2$ or —CH$_2$CH$_2$Z$^1$, wherein Z$^1$ is hydroxyl or a group which can be eliminated under the action of alkali, R$^{200}$ and R$^{201}$ independent of one another is hydrogen, C$_1$-C$_6$-alkyl,—which is linear or branched and is unsubstituted or substituted by amino, (C$_1$-C$_4$)-alkylamino, hydroxyl, (C$_1$-C$_4$)-alkoxy, sulfa, halogen, carboxyl, acetamido or ureido; phenyl, —which is unsubstituted or substituted by (C$_1$-C$_4$)-alkyl, (C$_1$-C$_4$)-alkoxy, sulfo, halogen, carboxyl, acetamido or ureido; amino, (C$_1$-C$_4$)-alkylamino, hydroxyl, (C$_1$-C$_4$)-alkoxy, sulfo, carboxyl, cyano, halogen, nitro, amido or ureido, R* and R** independent of one another is hydrogen, (C$_1$-C$_4$)-alkyl, CO—(C$_1$-C$_4$-alkyl) or —CH$_2$—SO$_3$M, M is hydrogen, an alkali metal or one equivalent of an alkaline earth metal, and wherein the sum of weights of all dyes of formula (I) that are present in the dye mixture is at least 40% of the weight of the dye mixture—calculated on the basis of the sum of weights of all dyes according to formulae (I), (II), (III) and (IV) that are present in the dye mixture.

(C$_1$-C$_4$)-Alkyl groups may be straight-chain or branched and preferably are selected from the group consisting of methyl, ethyl, n-propyl, isopropyl, n-butyl, isobutyl, sec-butyl and tert-butyl. Methyl and ethyl are most preferred.

Analoguous definitions apply to (C$_1$-C$_4$)-alkoxy groups, thus leading to methoxy and ethoxy being the most preferred members.

Halogen preferably is fluorine, chlorine or bromine, with preference being given to bromine and chlorine.

A group which can be eliminated under the action of alkali, i.e. an alkali-eliminable substituent Z$^1$ in the β position of the ethyl group of Z is for example:

a halogen atom—preferably chlorine or bromine, ester groups of organic carboxylic or sulfonic acids—preferably alkylcarboxylic acids, unsubstituted or substituted benzenecarboxylic acids and unsubstituted or substituted benzenesulfonic acids, such as the alkanoyloxy groups having 2 to 5 carbon atoms, even more preferably selected from the group consisting of: acetyloxy, benzoyloxy, sulfobenzoyloxy, phenylsulfonyloxy and tolylsulfonyloxy, acidic ester groups of inorganic acids—preferably those of phosphoric acid, sulfuric acid or thiosulfuric acid (phosphato, sulfato or thiosulfato groups), and dialkylamino groups having alkyl groups with 1 to 4 carbon atoms each—preferably dimethylamino and diethylamino.

Z is preferably vinyl or β-chloroethyl and most preferred is β-sulfatoethyl.

With regard to the present invention the groups "sulfo", "carboxyl", "thiosulfato", "phosphato" and "sulfato" include not only their acid form, but also their salt form. Accordingly, sulfo groups are groups of the formula —SO$_3$M, thiosulfato groups are groups of the formula —S—SO$_3$M, carboxyl groups are groups of the formula —COOM, phosphato groups are groups of the formula —OPO$_3$M$_2$ and sulfato groups are groups of the formula —OSO$_3$M, each with M being defined as above.

Within the definition of Z, the dyes of formula (II), (III) and (IV) may possess different fiber-reactive groups —SO$_2$Z.

In case M is an alkali metal, M preferably is lithium, sodium or potassium. In general M most preferably is hydrogen or sodium.

The radical R$^{200}$ is preferably hydrogen, amino, methyl, sulfo or carboxyl, particularly preferred is hydrogen.

The radical R$^{201}$ is preferably hydrogen, methyl, hydroxymethyl, hydroxyl, methoxy, sulfo or carboxyl, particularly preferred is sulfo.

The radicals R* and R** in formulae (II) and (III) are, independently of one another, preferably hydrogen, methyl or carboxy, particular preference being given to hydrogen.

The radicals R$^1$ and R$^2$ are preferably hydrogen, (C$_1$-C$_4$)-alkyl groups, (C$_1$-C$_4$)-alkoxy groups, sulfo or carboxyl and more preferably hydrogen, methyl, methoxy or sulfo, particular preference being given to hydrogen and sulfo.

Non-limiting examples of groups D$^1$ and D$^2$ of formula (1) are: 2-(vinylsulfonyl)phenyl, 3-(vinylsulfonyl)phenyl, 4-(vinylsulfonyl)phenyl, 2-carboxy-5-(vinylsulfonyl)phenyl, 2-chloro-4-(vinylsulfonyl)phenyl, 2-chloro-5-(vinylsulfonyl)phenyl, 2-bromo-4-(vinylsulfonyl)phenyl, 2-sulfo-4-(vinylsulfonyl)phenyl, 2-sulfo-5-(vinylsulfonyl)-phenyl, 2-methoxy-5-(vinylsulfonyl)phenyl, 2-ethoxy-5-(vinylsulfonyl)phenyl, 2,5-dimethoxy-4-(vinylsulfonyl)phenyl, 2-methoxy-5-methyl-4-(vinylsulfonyl)phenyl, 2-methyl-4-(vinylsulfonyl)phenyl and 2-sulfo-4-(vinylsulfonyl)phenyl.

Preferred are: 2-sulfo-4-(vinylsulfonyl)phenyl, 2-methoxy-5-(vinylsulfonyl)phenyl, 2,5-dimethoxy-4-(vinylsulfonyl)phenyl, 2-methoxy-5-methyl-4-(vinylsulfonyl) phenyl, 3- and 4-(vinylsulfonyl)phenyl.

Most preferred are: 2-sulfo-4-(vinylsulfonyl)phenyl and 4-(vinylsulfonyl)phenyl.

Non-limiting examples of groups D$^3$ and D$^4$ of formula (1) are: 2-(β-sulfatoethylsulfonyl)-phenyl, 3-(β-sulfatoethylsulfonyl)phenyl, 4-(β-sulfatoethylsulfonyl)phenyl, 2-carboxy-5-(β-sulfatoethylsulfonyl)phenyl, 2-chloro-4-(β-sulfatoethylsulfonyl)phenyl, 2-chloro-5-(β-sulfatoethylsulfonyl) phenyl, 2-bromo-4-(β-sulfatoethylsulfonyl)phenyl, 2-sulfo-4-(β-sulfatoethylsulfonyl)phenyl, 2-sulfo-5-(β-sulfatoethylsulfonyl)phenyl, 2-methoxy-5-(β-sulfatoethylsulfonyl)phenyl, 2-ethoxy-5-(β-sulfatoethylsulfonyl)phenyl, 2,5-dimethoxy-4-(β-sulfatoethylsulfonyl)phenyl, 2-methoxy-5-methyl-4-(β-sulfatoethylsulfonyl)phenyl, 2-methyl-4-(β-sulfatoethylsulfonyl)phenyl, 2-, 3- or 4-(β-thiosulfatoethylsulfonyl)phenyl, 2-methoxy-5-(β-thiosulfatoethylsulfonyl)phenyl, 2-sulfo-4-(β-phosphatoethyl-sulfonyl)phenyl, 2-, 3- or 4-vinylsulfonylphenyl, 2-sulfo-4-vinylsulfonylphenyl, 2-chloro-4-(β-chloroethylsulfonyl)phenyl, 2-chloro-5-(β-chloroethylsulfonyl)phenyl, 3- or 4-(β-acetoxyethylsulfonyl)phenyl, ortho-, meta- or para-sulfanilic acide, 2-carboxy-anilin, 3-carboxy-anilin and 4-carboxy-anilin.

Preferred are: 3-(β-sulfatoethylsulfonyl)phenyl, 4-(β-sulfatoethylsulfonyl)phenyl, 2-sulfo-4-(β-sulfatoethylsulfonyl)phenyl, 2-methoxy-5-(β-sulfatoethylsulfonyl)phenyl, 2,5-dimethoxy-4-(β-sulfatoethyl-sulfonyl)phenyl, 2-methoxy-5-methyl-4-(β-sulfatoethyl-sulfonyl)phenyl, 3- or 4-(vinylsulfonyl)phenyl, ortho- or para-sulfanilic acide, 2-carboxy-anilin and 4-carboxy-anilin.

Most preferred are: 4-(β-sulfatoethylsulfonyl)phenyl, 2-sulfo-4-(β-sulfatoethylsulfonyl)-phenyl, 4-(vinylsulfonyl) phenyl, 2-sulfo-4-(vinylsulfonyl)phenyl, para-sulfanilic acide and 4-carboxy-anilin.

In a preferred embodiment D$^1$ to D$^4$ are a group of formula (1) and X$^1$ is —SO$_2$Z. In such a case it is particularly preferred that the SO$_2$Z group is positioned meta or para to the diazo group.

Whilst some components have to be combined others may be combined. Accordingly there exist some combinations of dye mixtures that are preferred.

A dye mixture comprising one dye of formula (I) and one dye of formula (II) is a preferred embodiment of the present invention.

A dye mixture comprising one dye of formula (I) and one dye of formula (III) is another preferred embodiment of the present invention.

Also a dye mixture comprising one dye of formula (I), one dye of formula (II) and one dye of formula (III) is a preferred embodiment of the present invention.

Since optional component (IV) may advantageously also be present there exist even more preferred embodiments:

A dye mixture comprising one dye of formula (I), one dye of formula (II) and one dye of formula (IV) is a preferred embodiment of the present invention.

A dye mixture comprising one dye of formula (I), one dye of formula (III) and one dye of formula (IV) is another preferred embodiment of the present invention.

And a dye mixture comprising one dye of formula (I), one dye of formula (II), one dye of formula (III) and one dye of formula (IV) is a preferred embodiment of the present invention.

For the sum of weights of all dyes of formula (I) that are present in the dye mixture there also exist preferred values: This sum shall be at least 40%, preferably 45%, more preferred 50%, even more preferred 55% and most preferred 60% of the weight of the dye mixture—calculated on the basis of the sum of weights of all dyes according to formulae (I), (II), (Ill) and (IV) that are present in the dye mixture For all components of the dye mixture there exist species that are preferable compared to other species of the same formula.

Thus a dye mixture as described above, wherein one or more dye(s) of formula (I) to (IV) independent from each other is/are:

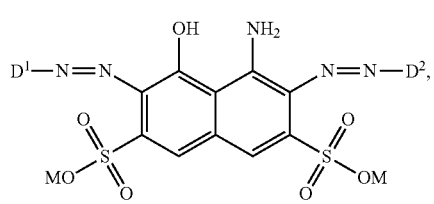
(I-a)

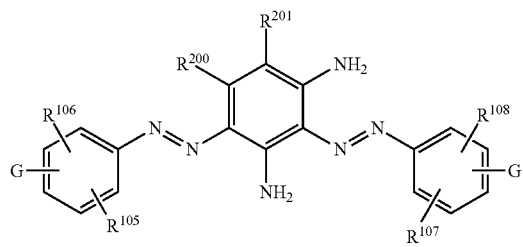
(II-a)

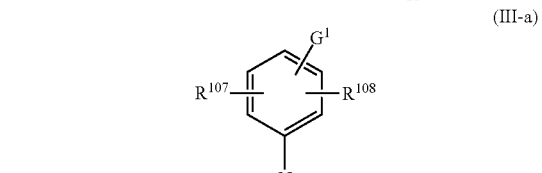
(III-a)

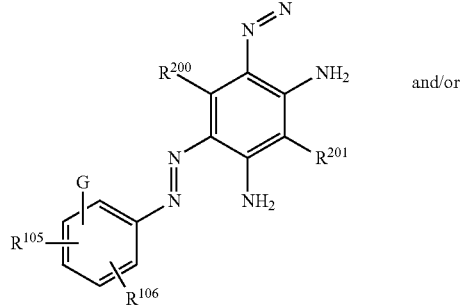
and/or

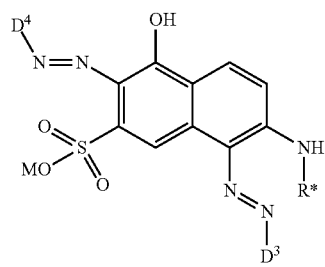
(IV-a)

wherein $D^1$ to $D^4$ and $R^*$ are as defined above and $R^{105}$ to $R^{108}$ independent of one another is hydrogen, $C_1$-$C_4$-alkyl, $C_1$-$C_4$-alkoxy, sulfo, carboxy, —CN, —COOR$^1$ or —CONR$^2$R$^3$, wherein $R^1$ is M or ($C_1$-$C_4$)-alkyl, $R^2$ and $R^3$ independent of one another is H or ($C_1$-$C_4$)-alkyl, $R^{200}$ and $R^{201}$ independent of one another is hydroxyl, ($C_1$-$C_4$)-alkoxy, sulfo, halogen, carboxyl, acetamido, ureido, amino, ($C_1$-$C_4$)-alkylamino or phenyl, which phenyl is unsubstituted or substituted by a substituent selected from the group consisting of ($C_1$-$C_4$)-alkyl, ($C_1$-$C_4$)-alkoxy, sulfo, halogen, carboxyl, acetamido and ureido, G and $G^1$ is SO$_2$Z or hydrogen, with the proviso that not both G and G1 are hydrogen, Z is vinyl, β-sulfatoethyl or hydroxyl and M is hydrogen, an alkali metal or one equivalent of an alkaline earth metal is preferred.

Even more preferred is a dye mixture as described above, wherein one or more dye(s) of formula (I) to (IV) independent from each other is/are:

(I-b)

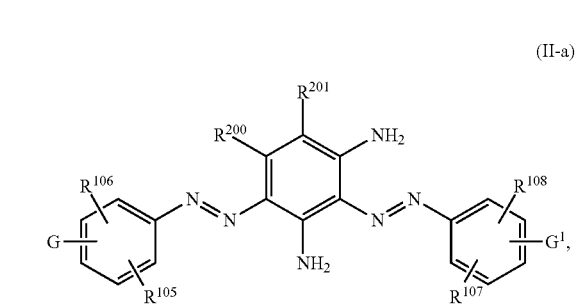

(II-a)

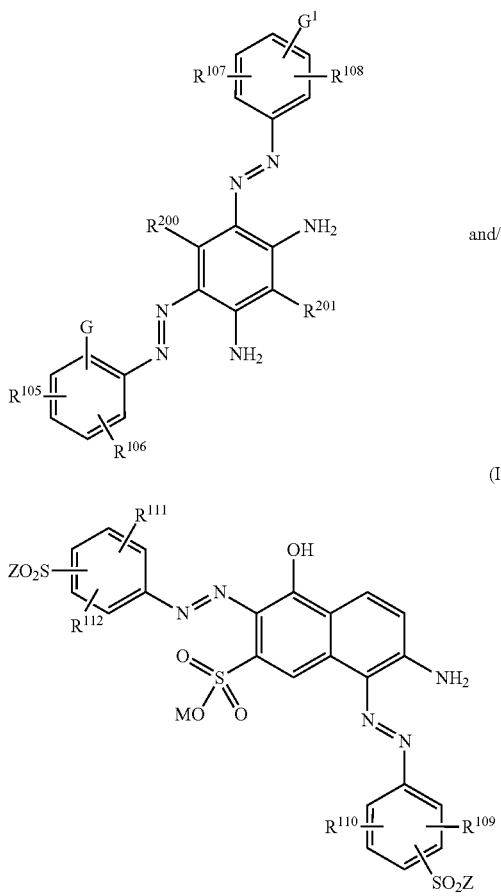

wherein
R$^{101}$ to R$^{112}$ independent of one another is hydrogen, carboxy, sulfo, (C$_1$-C$_4$)-alkyl or (C$_1$-C$_4$)-alkoxy,
R$^{200}$ and R$^{201}$ independent of one another is hydrogen, carboxy, sulfo or amino,
G and G$^1$ are SO$_2$Z or hydrogen with the proviso that not both G and G1 are hydrogen,
Z is vinyl, β-sulfatoethyl or hydroxyl and
M is hydrogen or an alkali metal.

A dye mixture as described above, wherein one or more dye(s) of formula (I) to (IV) independent from each other is:

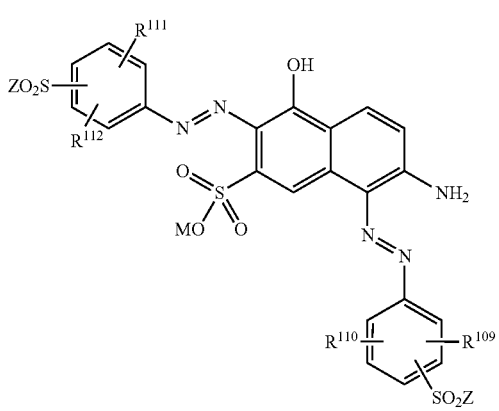

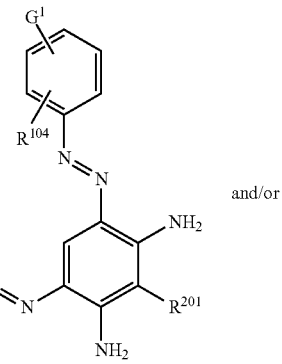

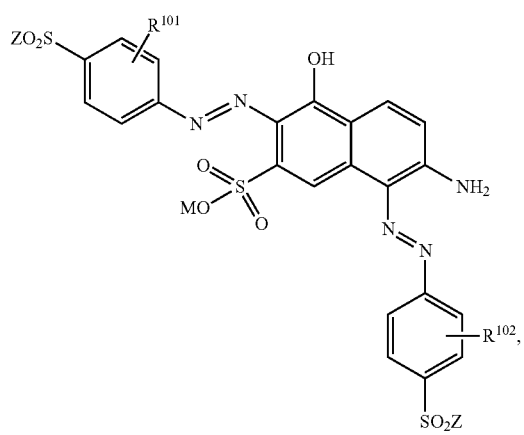

wherein
R$^{101}$ and R$^{102}$ independent of one another is hydrogen or sulfo,
R$^{103}$ and R$^{104}$ independent of one another is hydrogen, sulfo or carboxy,
R$^{201}$ is hydrogen of sulfo,
G and G$^1$ is SO$_2$Z or hydrogen with the proviso that not both G and G1 are hydrogen,
Z is vinyl, β-sulfatoethyl or hydroxyl and
M is hydrogen or an alkali metal is even more preferred.

All components that are shown above can be combined independent from each other. Thus a combination of e.g. a dye of formula (I) and a dye of formula (IIc) would fall within the scope of the present invention and would be a preferred embodiment. Obviously those combinations in which preferred single dyes are combined are most preferred. Thus a dye mixture comprising e.g. dyes of formulae (I-b) and (II-a) is more preferred than a dye mixture comprising e.g. dyes of formulae (I-a) and (II-a). And most preferred are dye mixtures comprising dyes of formulae
(I-c) and (II-c),
(I-c) and (III-c),
(I-c), (II-c) and (III-c) as well as mixtures comprising dyes of formulae:
(I-c), (II-c) and (IV-c),
(I-c), (III-c) and (IV-c),
(I-c), (II-c), (III-c) and (IV-c), all with the definitions given above.

Based on that it can be derived that a dye mixture is preferred, which comprises one or more dye(s) of formula (I-a):

one or more dye(s) of formula (I-a)

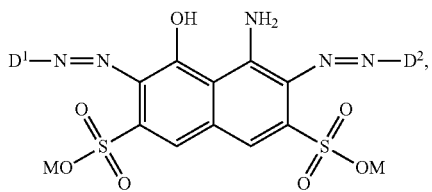

one or more dyes of formula (I-b)

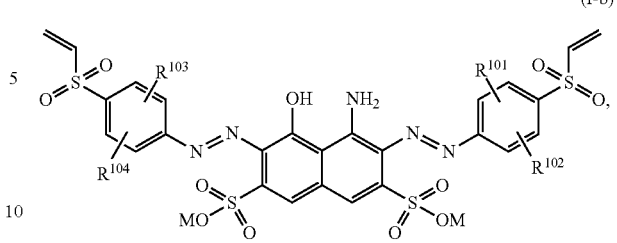

one or more dye(s) of formula (II-a)

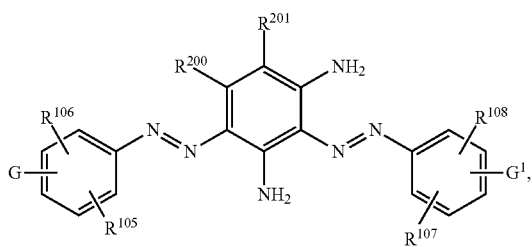

one or more dyes of formula (II-a)

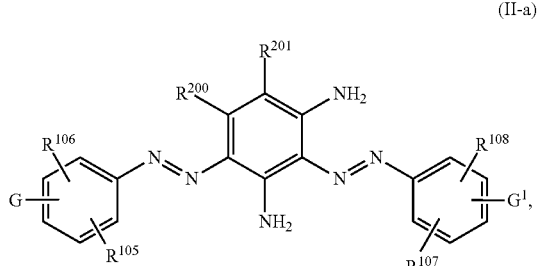

and optionally one or more dye(s) of formula (IV-a)

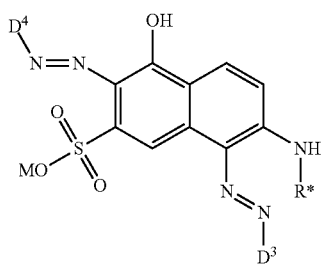

and optionally one or more dyes of formula (IV-b)

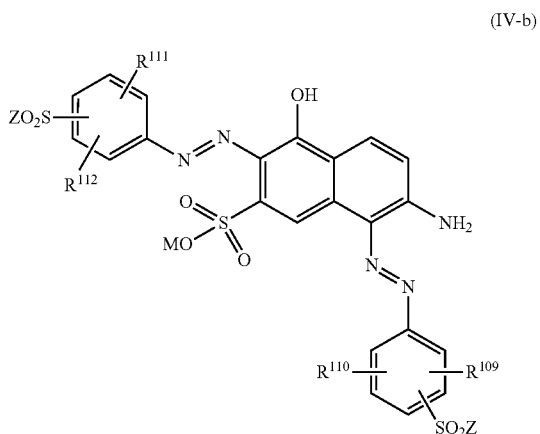

wherein $D^1$ to $D^4$ and R* are as defined above and $R^{105}$ to $R^{108}$ independent of one another is hydrogen, $C_1$-$C_4$-alkyl, $C_1$-$C_4$-alkoxy, sulfo, carboxy, —CN, —COOR$^1$ or —CONR$^2$R$^3$, wherein $R^1$ is M or ($C_1$-$C_4$)-alkyl, $R^2$ and $R^3$ independent of one another is H or ($C_1$-$C_4$)-alkyl, $R^{200}$ and $R^{201}$ independent of one another is hydroxyl, ($C_1$-$C_4$)-alkoxy, sulfo, halogen, carboxyl, acetamido, ureido, amino, ($C_1$-$C_4$)-alkylamino or phenyl, which phenyl is unsubstituted or substituted by a substituent selected from the group consisting of ($C_1$-$C_4$)-alkyl, ($C_1$-$C_4$)-alkoxy, sulfo, halogen, carboxyl, acetamido and ureido, G and $G^1$ is SO$_2$Z or hydrogen, with the proviso that not both G and G1 are hydrogen, Z is vinyl, β-sulfatoethyl or hydroxyl and M is hydrogen, an alkali metal or one equivalent of an alkaline earth metal.

Even more preferred is a dye mixture as described above comprising one or more dye(s) of formula (I-b)

wherein $R^{101}$ to $R^{112}$ independent of one another is hydrogen, carboxy, sulfo, ($C_1$-$C_4$)-alkyl or ($C_1$-$C_4$)-alkoxy, $R^{200}$ and $R^{201}$ independent of one another is hydrogen, carboxy, sulfo or amino, G and $G^1$ are SO$_2$Z or hydrogen with the proviso that not both G and $G^1$ are hydrogen, Z is vinyl, β-sulfatoethyl or hydroxyl and M is hydrogen or an alkali metal.

A dye mixture as described above, comprising one or more dye(s) of formula (I-c)

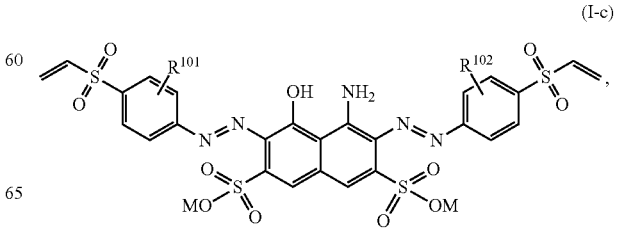

one or more dye(s) of formula (II-c)

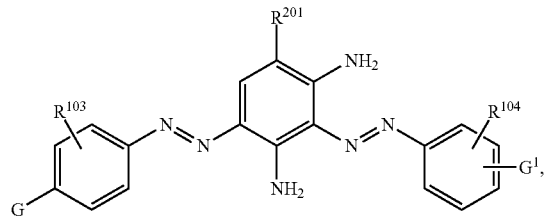
(II-c)

and optionally one or more dye(s) of formula (IV-c)

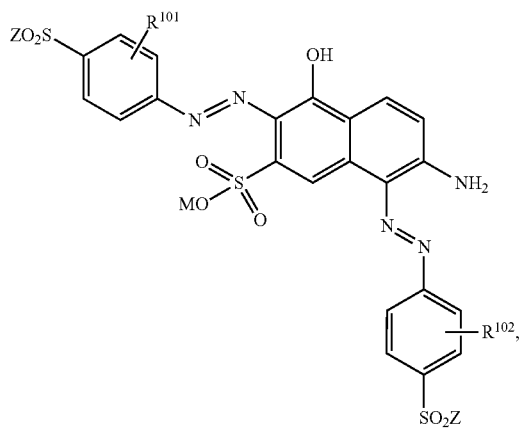
(IV-c)

wherein
$R^{101}$ and $R^{102}$ independent of one another is hydrogen or sulfo,
$R^{103}$ and $R^{104}$ independent of one another is hydrogen, sulfo or carboxy,
$R^{201}$ is hydrogen or sulfo,
G and $G^1$ is $SO_2Z$ or hydrogen with the proviso that not both G and G1 are hydrogen,
Z is vinyl, β-sulfatoethyl or hydroxyl and
M is hydrogen or an alkali metal is even more preferred.

Another preferred aspect of the present invention is a dye mixture as described above, comprising
one or more dye(s) of formula (I-a)

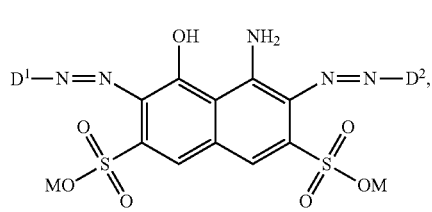
(I-a)

one or more dye(s) of formula (III-a)

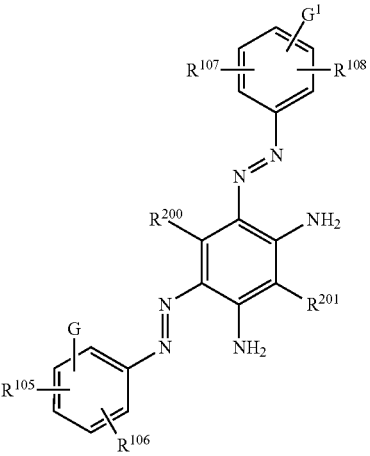
(III-a)

and optionally one or more dye(s) of formula (IV-a)

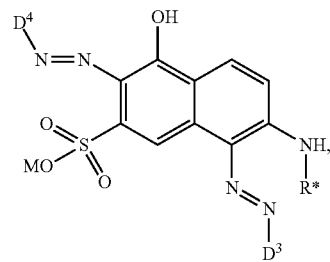
(IV-a)

wherein $D^1$ to $D^4$ and R* are as defined above and
$R^{105}$ to $R^{108}$ independent of one another is hydrogen, $C_1$-$C_4$-alkyl, $C_1$-$C_4$-alkoxy, sulfo, carboxy, —CN, —$COOR^1$ or —$CONR^2R^3$, wherein
$R^1$ is M or ($C_1$-$C_4$)-alkyl,
$R^2$ and $R^3$ independent of one another is H or ($C_1$-$C_4$)-alkyl,
$R^{200}$ and $R^{201}$ independent of one another is hydroxyl, ($C_1$-$C_4$)-alkoxy, sulfo, halogen, carboxyl, acetamido, ureido, amino, ($C_1$-$C_4$)-alkylamino or phenyl, which phenyl is unsubstituted or substituted by a substituent selected from the group consisting of ($C_1$-$C_4$)-alkyl, ($C_1$-$C_4$)-alkoxy, sulfo, halogen, carboxyl, acetamido and ureido,
G and $G^1$ is $SO_2Z$ or hydrogen, with the proviso that not both G and G1 are hydrogen,
Z is vinyl, β-sulfatoethyl or hydroxyl and
M is hydrogen, an alkali metal or one equivalent of an alkaline earth metal.

Even more preferred is a dye mixture as described above, comprising
one or more dye(s) of formula (I-b)

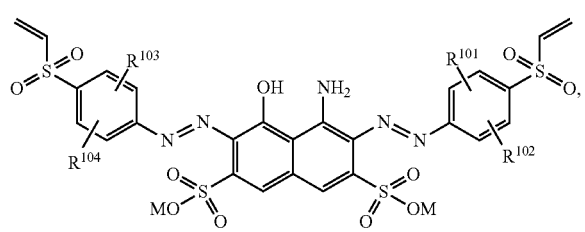
(I-b)

one or more dye(s) of formula (III-a)

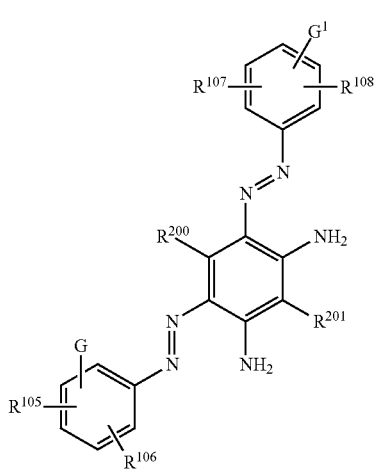

and optionally one or more dye(s) of formula (IV-b)

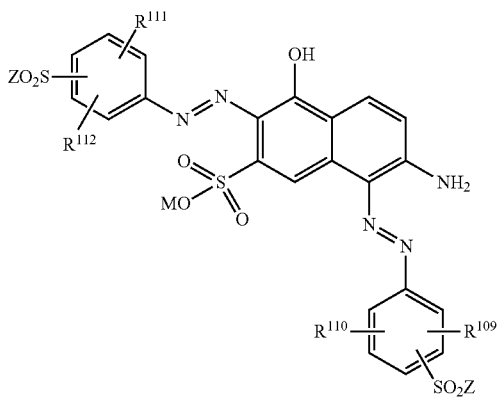

wherein
$R^{101}$ to $R^{112}$ independent of one another is hydrogen, carboxy, sulfa, $(C_1\text{-}C_4)$-alkyl or $(C_1\text{-}C_4)$-alkoxy,
$R^{200}$ and $R^{201}$ independent of one another is hydrogen, carboxy, sulfo or amino,
G and $G^1$ are $SO_2Z$ or hydrogen with the proviso that not both G and G1 are hydrogen,
Z is vinyl, β-sulfatoethyl or hydroxyl and
M is hydrogen or an alkali metal.

A dye mixture as described above, comprising
one or more dye(s) of formula (I-c)

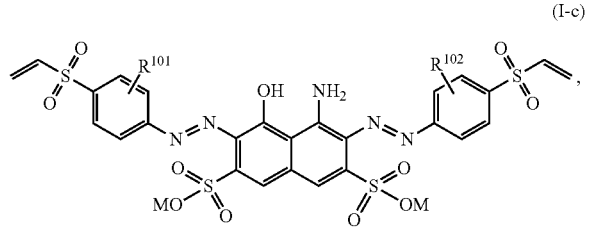

one or more dye(s) of formula (III-c)

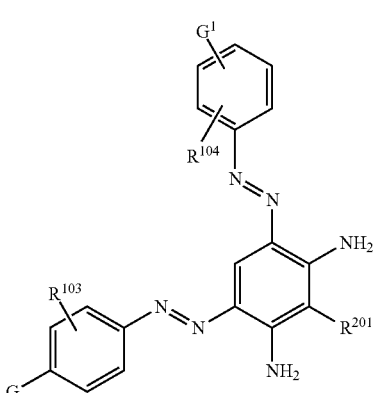

and optionally one or more dye(s) of formula (IV-c)

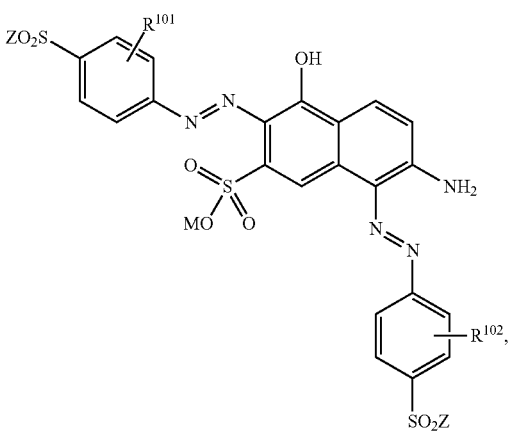

wherein
$R^{101}$ and $R^{102}$ independent of one another is hydrogen or sulfo,
$R^{103}$ and $R^{104}$ independent of one another is hydrogen, sulfo or carboxy,
$R^{201}$ is hydrogen or sulfo,
G and $G^1$ is $SO_2Z$ or hydrogen with the proviso that not both G and G1 are hydrogen,
Z is vinyl, β-sulfatoethyl or hydroxyl and
M is hydrogen or an alkali metal is even more preferred.

The dye mixtures of the invention can be produced by methods which are conventional per se and are known to the person skilled in the art.

One preferred preparation method comprises mechanically mixing the individual dyes of formulae (I) with (II) and/or (III), and also, if desired, of formulae (IV) in the desired ratio.

The order of mixing the substances in general is not of relevance.

The dyes as well as the inventive dye mixture can be used in the form of dye powders or dye granules, of synthesis solutions or of aqueous solutions in general, which may additionally include typical auxiliaries.

In another preferred production method for the inventive dye mixtures, suitable mixtures of diazo components and coupling components are reacted in the desired proportions in diazotization and coupling reactions familiar to the person skilled in the art.

Dyes similar to those of formula (I) are described in great number in the literature and are known for example from U.S. Pat. No. 2,657,205, JP Sho-58-160 362, and also from U.S. Pat. No. 4,257,770 and the references given therein.

Dyes of formula (II) and/or (III) are described for example in EP 1 035 171, WO 2004/069937, EP 1 669 415 and also in EP 2 376 578.

Depending on the definition of the substituent in position 6 of the precursor (being=Hydrogen or ≠Hydrogen) the diazo-components $D^3$ and $D^4$ will react to product (II) or (III):

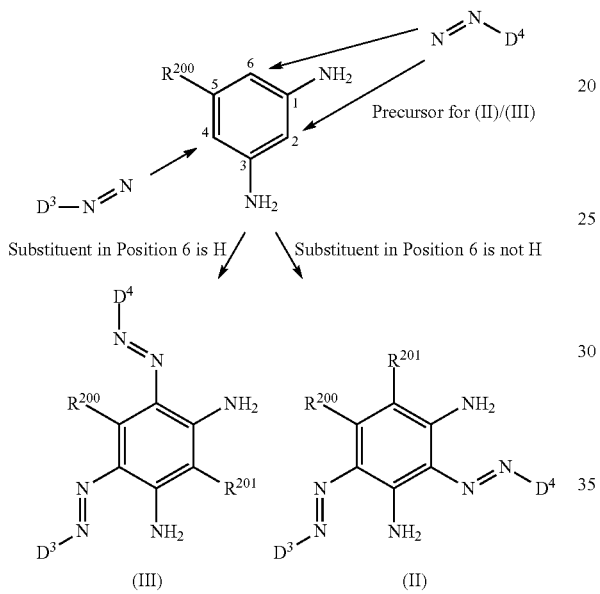

Dyes of formula (IV) are described for example in JP 8060017 and
DE 196 00 765 A1.

Because the standard procedure of producing dyes of formula (II) and (III) respectively leads to only one of them, mixtures containing both may be obtained by mixing either the precursers and then using the resulting reaction mix of dyes having formula (II) and (III) or mixing the dyes themselves after having produced them separately. Thus the present invention may also be described as dye mixture comprising one or more dye(s) of:
formula (I)

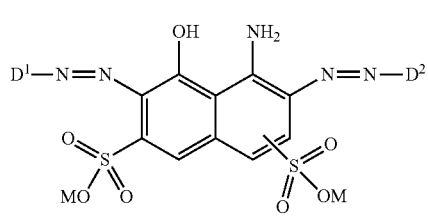

and one or more dye(s) selected from the group consisting of formula (II) and (III);

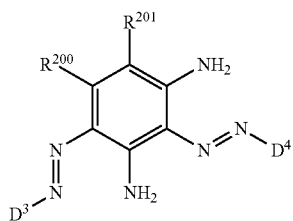

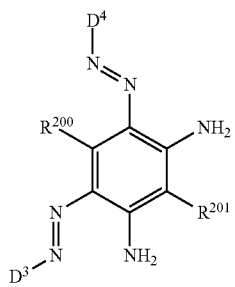

and optionally one or more dye(s) of formula (IV)

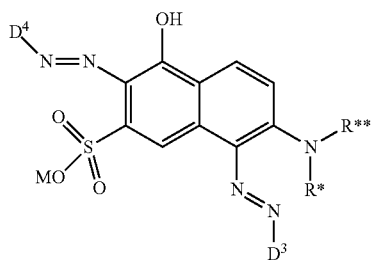

wherein
$D^1$ and $D^2$ independent of one another is group of formula (1)

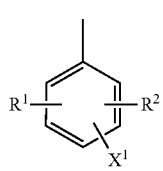

wherein
$R^1$ and $R^2$ independent of one another is hydrogen, $(C_1$-$C_4)$-alkyl, $(C_1$-$C_4)$-alkoxy, sulfo, carboxyl, amido or ureido,
$X^1$ is hydrogen or —$SO_2$—CH=$CH_2$,
$D^3$ and $D^4$ independent of one another is a group of formula (1)
wherein
$R^1$ and $R^2$ independent of one another is hydrogen, $(C_1$-$C_4)$-alkyl, $(C_1$-$C_4)$-alkoxy, sulfo, carboxyl, amido or ureido,
$X^1$ is hydrogen or a group of the formula: —$SO_2$—Z, wherein
Z is hydroxyl, —CH=$CH_2$ or —$CH_2CH_2Z^1$, wherein $Z^1$ is hydroxyl or a group which can be eliminated under the action of alkali, $R^{200}$ and $R^{201}$ independent of one another is hydrogen, $C_1$-$C_6$-alkyl, —which is linear or branched and is unsubstituted or substituted by amino, ($C_1$-$C_4$)-alkylamino, hydroxyl, ($C_1$-$C_4$)-alkoxy, sulfo, halogen, carboxyl, acetamido or ureido; phenyl,—which is unsubstituted or substituted by ($C_1$-$C_4$)-alkyl, ($C_1$-$C_4$)-alkoxy, sulfo, halogen, carboxyl, acetamido or ureido; amino, ($C_1$-$C_4$)-alkylamino, hydroxyl, ($C_1$-$C_4$)-alkoxy, sulfo, carboxyl, cyano, halogen, nitro, amido or ureido, $R^*$ and $R^{**}$ independent of one another is hydrogen, ($C_1$-$C_4$)-alkyl, CO—($C_1$-$C_4$-alkyl) or —$CH_2$—$SO_3M$, M is hydrogen, an alkali metal or one equivalent of an alkaline earth metal, and wherein the sum of weights of all dyes of formula (I) that are present in the dye mixture is at least 40% of the weight of the dye mixture—calculated on the basis of the sum of weights of all dyes according to formulae (I), (II), (Ill) and (IV) that are present in the dye mixture.

The dye mixtures of this invention may be present as a preparation in solid or in liquid (dissolved) form.

In solid form such preparation may include, where advantageous, the electrolyte salts which are customary in the case of water-soluble and, in particular, fiber-reactive dyes, such as sodium chloride, potassium chloride and sodium sulfate, and may further include the auxiliaries that are customary in commercial dyes, such as buffer substances capable of setting a pH in aqueous solution of between 3 and 7, such as sodium acetate, sodium citrate, sodium borate, sodium hydrogen carbonate, sodium dihydrogen phosphate and disodium hydrogen phosphate, and also dyeing assistants, dedusting agents and small amounts of siccatives.

If they are present in liquid aqueous solution such preparation may also include thickeners of the type customary in printing pastes and e.g. substances, which ensure keeping the properties of these preparations, such as mold preventatives.

In solid form the inventive dye mixtures are generally present in the form of powders or granules (also referred to in general as preparations) additionally containing electrolyte salt and where appropriate with one or more of the abovementioned auxiliaries. The preparations comprise the inventive dye mixture at an amount of 20 to 90% by weight, based on the preparation comprising it. The buffer substances are generally present in a total amount of up to 5% by weight, based on the total preparation.

Where the inventive dye mixtures are present in aqueous solution, the total dye content of these preparations is up to 50% by weight, such as between 5 and 40% by weight. The electrolyte salt content of these preparations is preferably below 10% by weight, based on the aqueous solution; the preparations may comprise the aforementioned buffer substances generally in an amount of up to 5% by weight, preferably up to 2% by weight.

The dye mixtures of the invention possess valuable performance properties. They can be used for dyeing or printing hydroxyl- and/or carboxamido-containing materials, e.g. in the form of sheetlike structures, such as paper and leather, or of films, such as of polyamide, or in the mass, such as in polyamide and polyurethane just to name a few, but in particular for dyeing or printing these materials in fiber form.

The solutions of the dyes and the inventive dye mixtures that are obtained in the course of the synthesis can also be used directly as a liquid preparation for dyeing, where appropriate following addition of a buffer substance and, where appropriate, after concentration or dilution.

The use of a dye mixture as described above for dyeing or printing hydroxyl- and/or carboxamido-containing material is another aspect of the present invention.

The materials to be dyed are preferably employed in the form of fiber materials, particularly in the form of textile fibers, such as woven fabrics or yarns, as in the form of hanks or wound packages.

Accordingly fiber and blends containing such fiber, with the fiber being selected from the group consisting of: synthetic fiber materials, nylon materials, nylon-6, nylon-6.6, aramid fibres, vegetable fibres, seed fibres, cotton, organic cotton, kapok, coir from coconut husk, bast fibers, flax, hemp, jute, kenaf, ramie, rattan, leaf fibres, sisal, henequen, banana, stalk fibres, bamboo, fibres from animals, wool, organic wool, silk, cashmere wool, alpaca fiber, mohair, Angora fibre, fur, leather materials, manufactured, regenerated and recycled fibres, cellulosic fibres, paper fibres, cellulosic regenerated fibres, viscose rayon fibres, acetate and triacetate fibers and Lyocell fibers comprising the dye mixture as described above in chemically and/or physically bound form are another aspect of the present invention.

The dye mixtures of the invention can be applied to and fixed on the stated substrates, in particular the stated fiber materials, by the application techniques that are known for water-soluble dyes and especially for fiber-reactive dyes. For instance, on cellulose fibers by the exhaust methods from a long liquor and also from a short liquor, in a liquor-to-goods ratio of 5:1 to 100:1, for example, preferably 6:1 to 30:1, using any of a wide variety of acid-binding agents and, where appropriate, neutral salts as far as is necessary, such as sodium chloride or sodium sulfate, they produce dyeings having very good color yields. Dyeing takes place preferably in an aqueous bath at temperatures between 10 and 105° C., where appropriate at a temperature up to 130° C. under superatmospheric pressure, but preferably at 30 to 95° C., especially 45 to 65° C., and optionally in the presence of customary dyeing assistants.

One possible procedure is to introduce the material to be dyed into the warm bath and gradually to heat the bath to the desired dyeing temperature, and to complete the dyeing operation at that temperature. The neutral salts which accelerate the exhaustion of the dyes may also, if desired, be added to the bath only after the actual dyeing temperature has been reached.

Padding processes likewise provide excellent color yields and very good color buildup on cellulose fibers, the dyes being fixable in conventional manner by batching at room temperature or elevated temperature, at up to about 60° C. for example, or in a continuous dyeing procedure, e.g. by means of a pad-dry-pad steam process, by steaming or using dry heat.

Similarly, the customary printing processes for cellulose fibers can be carried out in one step, e.g. by means of printing with a print paste containing sodium bicarbonate or another acid-binding agent, and by subsequent steaming at 100 to 103° C., or in two steps, e.g. by printing with a neutral to weakly acidic printing ink and then fixing either by passing the printed material through a hot alkaline bath containing electrolyte, or by overpadding it with an alkaline, electrolyte-containing padding liquor and subsequently batching or steaming or dry-heat-treating the alkali-over-padded material. Both procedures, i.e. one or two step process lead to strongly colored prints with well-defined contours and a clear white ground. The extent to which the outcome of the prints is dependent on fluctuations in fixing conditions is low, which is an additional advantage of the present invention.

When fixing by means of dry heat in accordance with the customary thermofix processes, hot air at 120 to 200° C. is used. In addition to the customary steam at 101 to 103° C. it is also possible to use superheated steam and pressurized steam with temperatures of up to 160° C.

The acid-binding agents which effect the fixation of the dyes in the dye mixtures of the invention on the cellulose fibers are, for example, water-soluble basic salts of alkali metals and likewise alkaline earth metals of organic or inorganic acids or compounds which liberate alkali when heated, and also alkali metal silicates. Mention may be made in particular of the alkali metal hydroxides and alkali metal salts of weak to moderately strong organic or inorganic acids, the alkali metal compounds referred to being preferably the sodium and potassium compounds. Examples of such acid-binding agents are sodium hydroxide, potassium hydroxide, sodium carbonate, sodium bicarbonate, potassium carbonate, sodium formate, sodium dihydrogen phosphate, disodium hydrogen phosphate, sodium trichloroacetate, trisodium phosphate or waterglass or mixtures thereof, such as mixtures of sodium hydroxide solution and waterglass.

An ink for digital textile printing by the inkjet process, comprising a dye mixture as described above is another aspect of the present invention.

The inks of the present invention comprise the inventive dye mixture in amounts from 0.1 to 50% by weight, preferably in amounts from 0.5 to 30% by weight and more preferably in amounts from 1 to 15% by weight based on the total weight of the ink. They may also include combinations of the inventive dye mixture with other reactive dyes used in textile printing. For the inks to be used in the continuous flow process, a conductivity of 0.5 to 25 mS/m can be set by adding an electrolyte.

Useful electrolytes include for example lithium nitrate and potassium nitrate.

The inks of the present invention may include organic solvents at a total level of 1 to 50% by weight and preferably of 5 to 30% by weight.

Suitable organic solvents are for example:
alcohols, e.g. methanol, ethanol, 1-propanol, isopropanol, 1-butanol, tert-butanol and pentyl alcohol,
polyhydric alcohols, e.g. 1,2-ethanediol, 1,2,3-propanetriol, butanediol, 1,3-butanediol, 1,4-butanediol, 1,2-propanediol, 1,3-propanediol, pentanediol, 1,4-pentanediol, 1,5-pentanediol, hexanediol, D,L-1,2-hexanediol, 1,6-hexanediol, 1,2,6-hexanetriol and 1,2-octanediol,
polyalkylene glycols, e.g. polyethylene glycol and polypropylene glycol,
alkylene glycols having 2 to 8 alkylene groups, e.g. monoethylene glycol, diethylene glycol, triethylene glycol, tetraethylene glycol, thioglycol, thiodiglycol, butyltriglycol, hexylene glycol, propylene glycol, dipropylene glycol and tripropylene glycol,
low alkyl ethers of polyhydric alcohols, e.g. ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol monohexyl ether, triethylene glycol monomethyl ether, triethylene glycol monobutyl ether, tripropylene glycol monomethyl ether, tetraethylene glycol monomethyl ether, tetraethylene glycol monobutyl ether, tetraethylene glycol dimethyl ether, propylene glycol monomethyl ether, propylene glycol monoethyl ether, propylene glycol monobutyl ether and tripropylene glycol isopropyl ether,
polyalkylene glycol ethers, e.g. polyethylene glycol monomethyl ether, polypropylene glycol glycerol ether, polyethylene glycol tridecyl ether and polyethylene glycol nonylphenyl ether,
amines, e.g. methylamine, ethylamine, diethylamine, triethylamine, dimethylamine, trimethylamine, dibutylamine, diethanolamine, triethanolamine, N-acetylethanolamine, N-formylethanolamine and ethylenediamine,
urea and it's derivatives, e.g. thiourea, N-methylurea, N,N'-dimethylurea, ethyleneurea and 1,1,3,3-tetramethylurea,
amides, e.g. dimethylformamide, dimethylacetamide and acetamide,
ketones or keto alcohols, e.g. acetone and diacetone alcohol,
cyclic ethers, e.g. tetrahydrofuran, dioxane, trimethylolethane, trimethylolpropane, 2-butoxyethanol, benzyl alcohol, gamma-butyrolactone and epsilon-caprolactam,
as well as sulfolane, dimethylsulfolane, methylsulfolane, dimethyl sulfone, butadiene sulfone, dimethyl sulfoxide, dibutyl sulfoxide, N-cyclohexylpyrrolidone, N-methyl-2-pyrrolidone, N-ethylpyrrolidone, 2-pyrrolidone, 1-(2-hydroxyethyl)-2-pyrrolidone, 1-(3-hydroxypropyl)-2-pyrrolidone, 1,3-dimethyl-2-imidazolidinone, 1,3-dimethyl-2-imidazolinone, 1,3-bismethoxymethylimidazolidine, 2-(2-methoxyethoxy)ethanol, 2-(2-ethoxyethoxy)ethanol, 2-(2-butoxyethoxy)ethanol, 2-(2-propoxyethoxy)ethanol, pyridine, piperidine, trimethoxypropane, 1,2-d imethoxypropane, ethyl acetate, ethylenediaminetetraacetate or ethyl pentyl ether.

The inks of the present invention may further include customary additives, for example viscosity moderators to set viscosities in the range from 0.5 to 40 mPas in a temperature range from 20 to 50° C. Preferred inks have a viscosity of 1 to 20 mPas and particularly preferred inks have a viscosity of 1.5 to 15 mPas.

Useful viscosity moderators include rheological additives, for example:
polyvinylcaprolactam, polyvinylpyrrolidone and their copolymers polyetherpolyol, associative thickeners, polyurea, polyurethane, sodium alginates, modified galacto-mannans, polyetherurea, polyurethane and nonionic cellulose ethers.

As further additives the inks of the present invention may include surface-active substances to set surface tensions of 20 to 65 mN/m, which are adapted if necessary as a function of the process used (thermal or piezo technology).

Useful surface-active substances include for example: all surfactants, preferably nonionic surfactants, butyldiglycol, 1,2-hexanediol.

The inks may further include customary additives, for example substances to inhibit fungal and bacterial growth in amounts from 0.01 to 1% by weight based on the total weight of the ink.

The inks may be prepared in a conventional manner by mixing the components in water.

The inks of the present invention are useful in inkjet printing processes for printing a wide variety of pretreated materials, such as silk, leather, wool, polyamide fibers and polyurethanes, and especially cellulosic fiber materials of any kind. Such fiber materials are for example the natural cellulose fibers, such as cotton, linen and hemp, and also pulp and regenerated cellulose. The printing inks of the invention are also useful for printing pretreated hydroxyl- or amino-containing fibers present in blend fabrics, for example blends of cotton, silk and/or wool with polyester fibers or polyamide fibers.

In contrast to conventional textile printing, where the printing ink already contains all the fixing chemicals and thickeners for a reactive dye, in inkjet printing the auxiliaries have to be applied to the textile substrate in a separate pretreatment step.

The pretreatment of the textile substrate, for example cellulose and regenerated cellulose fibers and also silk and wool, is effected with an aqueous alkaline liquor prior to printing. To fix reactive dyes there is a need for alkali, for example sodium carbonate, sodium bicarbonate, sodium acetate, trisodium phosphate, sodium silicate, sodium hydroxide, alkali donors such as, for example, sodium chloroacetate, sodium formate, hydrotropic substances such as, for example, urea, reduction inhibitors, for example sodium nitrobenzenesulfonates, and also thickeners to prevent flowing of the motifs when the printing ink is applied, for example sodium alginates, modified polyacrylates or highly etherified galactomannans, These pretreatment reagents are uniformly applied to the textile substrate in a defined amount using suitable applicators, for example using a 2- or 3-roll pad, using contactless spraying technologies, by means of foam application or using appropriately adapted inkjet technologies, and subsequently dried.

After printing, the textile fiber material is dried at 120 to 150° C. and subsequently fixed.

The fixing of the inkjet prints prepared with reactive dyes may be effected at room temperature or with saturated steam, with superheated steam, with hot air, with microwaves, with infrared radiation, with laser or electron beams or with other suitable energy transfer techniques.

A distinction is made between one- and two-phase fixing processes:

In one-phase fixing, the necessary fixing chemicals are already on the textile substrate. In two-phase fixing, this pretreatment is unnecessary. Fixing only requires alkali, which, following inkjet printing, is applied prior to the fixing process, without intermediate drying. There is no need for further additives such as urea or thickener.

Fixing is followed by the print aftertreatment, which is the prerequisite for good fastness properties, high brilliance and an impeccable white ground.

The dye mixtures according to the invention are notable for outstanding color strength when applied to the cellulose fiber materials by dyeing or printing, said strength being in some cases attainable even in the presence of no or very small amounts of alkali or alkaline earth metal compounds. In these special cases, for instance, no electrolyte salt is required for a shallow depth of shade, not more than 5 g/l of electrolyte salt is required for a medium depth of shade and not more than 10 g/l of electrolyte salt is required for deep shades.

In this context a shallow depth of shade refers to the use of up to 2% by weight of dye based on the substrate to be dyed, a medium depth of shade refers to the use of 2 to 4% by weight of dye based on the substrate to be dyed, and a deep shade refers to the use of 4 to 10% by weight of dye based on the substrate to be dyed.

The dyeings and prints obtainable with the dye mixture according to the invention possess bright shades; more particularly, the dyeings and prints on cellulose fiber materials possess good lightfastness and especially good wetfastness properties, such as fastness to washing, milling, water, seawater, crossdyeing and acidic and alkaline perspiration, and also good fastness to pleating, hot pressing, and rubbing. Furthermore, the cellulose dyeings obtained following the customary aftertreatment of rinsing to remove unfixed dye portions exhibit excellent wetfastness properties, in particular since unfixed dye portions are easily washed off because of their good solubility in cold water.

The dye mixtures of the present invention can also be used for the fiber-reactive dyeing of wool. This includes wool which has been given a nonfelting or low-felting finish (cf., for example, H. Rath, Lehrbuch der Textilchemie, Springer-Verlag, 3rd edition (1972), pp. 295-9, particularly wool finished by the Hercosett process (p. 298); J. Soc. Dyers and Colourists 1972, 93-9, and 1975, 33-44) with very good fastness properties. Dyeing on wool takes place in a conventional manner from an acidic medium. For instance, acetic acid and/or ammonium sulfate or acetic acid and ammonium acetate or sodium acetate can be added to the dyebath in order to obtain the desired pH. To achieve a practicable levelness in the dyeing it is advisable to add customary leveling assistants, such as those based, for example, on a reaction product of cyanuric chloride with three times the molar amount of an aminobenzenesulfonic acid and/or an aminonaphthalenesulfonic acid or based on a reaction product of, for example, stearylamine with ethylene oxide. Thus, for example, the dye mixture of the present invention is preferably subjected first to the exhaust operation from an acidic dye bath having a pH of about 3.5 to 5.5, under pH control, and then, toward the end of the dyeing time, the pH is shifted into the neutral and, where appropriate, weakly alkaline range up to a pH of 8.5, in order to bring about, especially for very deep dyeings, the full reactive bond between the dyes of the dye mixtures of the invention and the fiber. At the same time the fraction of dye not reactively bound is detached.

The procedure described also applies to the production of dyeings on fiber materials composed of other natural polyamides or of synthetic polyamides and polyurethanes. In general the material to be dyed is introduced into the dyebath at a temperature of about 40° C., agitated therein for a certain time, and then the dyebath is adjusted to the desired weakly acidic, preferably weakly acetic acid, pH and the actual dyeing is carried out at a temperature between 60 and 98° C. Alternatively the dyeings can be performed at boiling temperature or, in closed dyeing apparatus, at temperatures of up to 106° C.

Since the water solubility of the dye mixtures of the invention is very good they can also be used with advantage in customary continuous dyeing processes. The color strength of the dye mixtures of the invention is very high.

On the stated materials, preferably fiber materials, the dye mixtures of the invention produce navy to deep-black dyeings having very good fastness properties.

The examples which follow serve to illustrate the invention. Parts and percentages are by weight unless noted otherwise. The relationship of parts by weight to parts by volume is that of the kilogram to the liter. The compounds described by a formula in the examples are written in the form of the sodium salts, since they are generally prepared and isolated in the form of their salts, preferably sodium or potassium salts, and are used in the form of their salts for coloring. The starting compounds specified in the examples below, especially tabular examples, can be used in the synthesis in the form of the free acid or likewise in the form of their salts, preferably alkali metal salts, such as sodium or potassium salts.

EXAMPLES

A. Examples of Compounds of Formula (I)

Example A-1

10 parts 2-[(4-Aminophenyl)sulfonyl]ethyl sodium sulfate (Parabase-ester) were mixed with 9 parts water, 3 parts ice and 3.9 parts hydrochloric acide 30% at 4 to 6° C. The mixture was diazotized with 4.8 parts of 40.5%ic sodium nitrit solution. To this parabase-ester diazotation 5.7 parts 1-amino-3,6-disulfo-8-hydroxy-naphthalene (H-acid) were added in potions. The product of the $1^{st}$ coupling reaction was transferred to a vessel containing 7 parts of water. During this transfer the pH was kept between pH 4.8 and 5.5 using 1.9 parts of sodium carbonate. After the $2^{nd}$ coupling the pH was adjusted to pH 8 to 9 and the mixture was stirred until vinylisation was completed. Then the product was isolated via filtration.

The resulting product has the following structure:

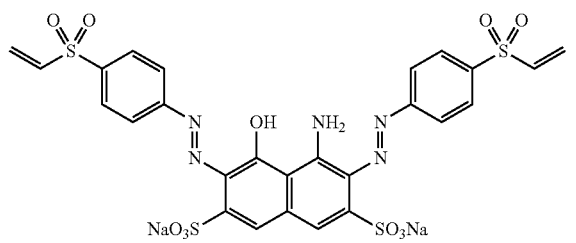
(A-1)

and dyes cotton in navy blue shades.

Examples A2-A5

The following compounds of formula (I) can be prepared accordingly using the corresponding diazo components:

Example A-2

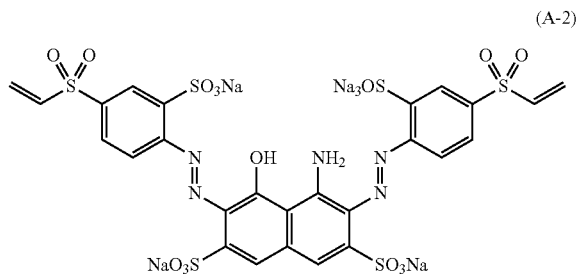
(A-2)

Dyes cotton in reddish blue shades.

Example A-3

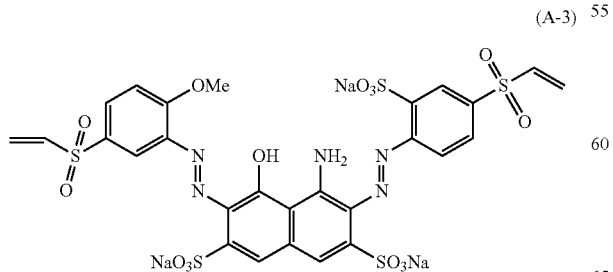
(A-3)

Dyes cotton in greenish blue shades

Example A-4

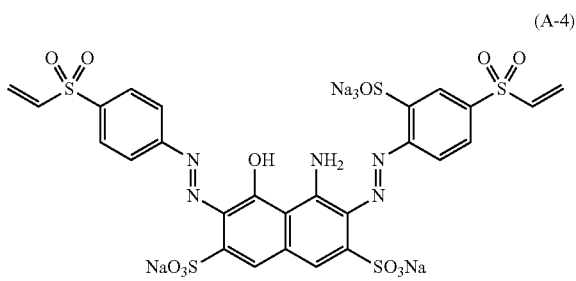
(A-4)

Dyes cotton in navy blue shades.

Example A-5

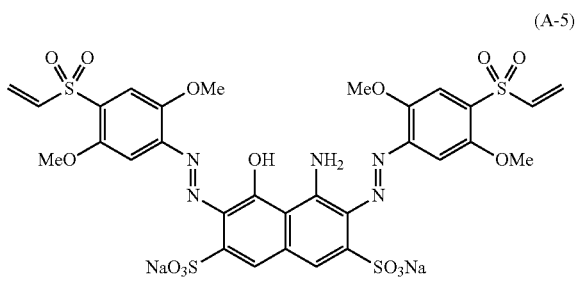
(A-5)

Dyes cotton in greenish blue shades

The dyes of formulae (II), (Ill) and (IV) can be synthesized according to the literature given above.

B. Examples of Mixtures of the Invention

Example B-1

60 parts dye of the formula (A-1)

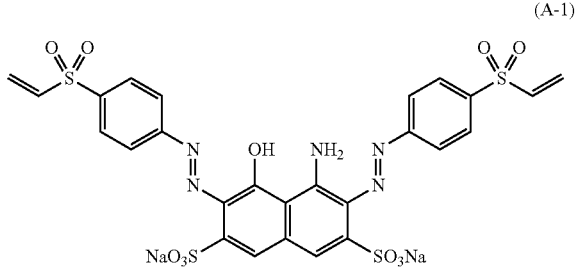
(A-1)

were mixed with 25 parts of a dye of the formula (II-1)

(II-1)

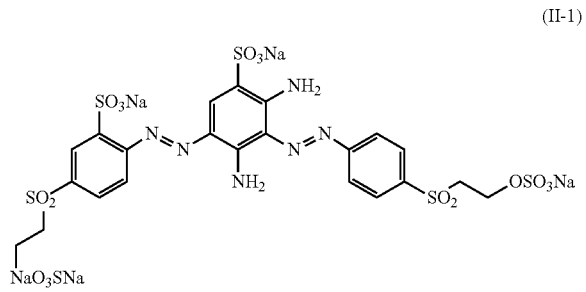

and mixed with 15 parts of a dye powder of the formula (IV-1)

(IV-1)

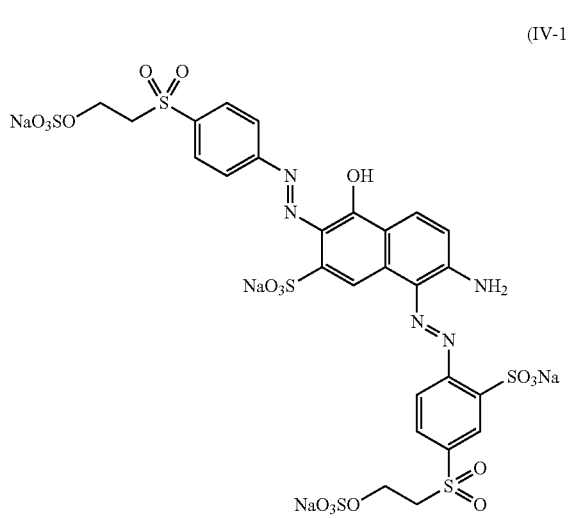

The resulting dye mixture of the invention was dried under reduced pressure or can be dryed via spray drying and gives very deep black dyeings and prints, on cotton for example, under the dyeing conditions typical for reactive dyes.

Thus the inventive dye mixture offers a high build up to very deep black shades as well as an excellent polyamide staining and a very good white dischargability.

Example B-2

54 parts dye of the formula (A-1)

(A-1)

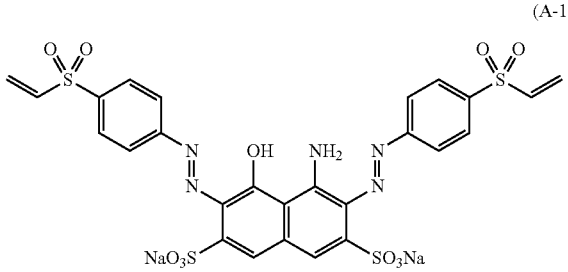

were mixed with 20 parts of a dye of the formula (III-1)

(III-1)

and mixed with 26 parts of a dye powder of the formula (IV-2)

(IV-2)

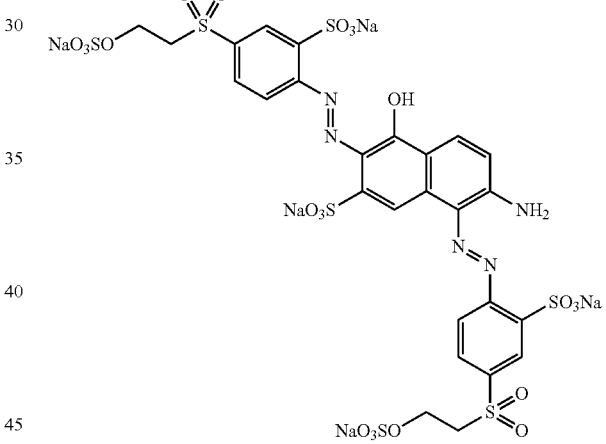

The resulting dye mixture of the invention was dried via spray drying or can be dryed under reduced pressure and gives very deep black dyeing and prints, on cotton for example, under the dyeing conditions typical for reactive dyes.

Example B-3

65 parts dye of the formula (A-4)

(A-4)

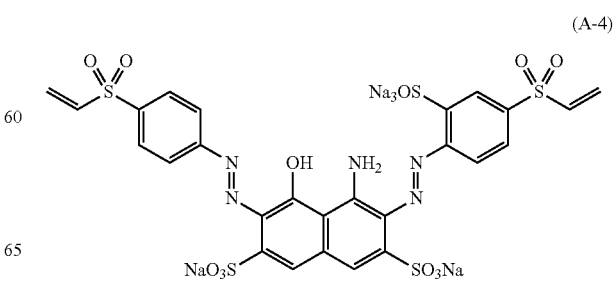

were mixed with 28 parts of a dye of the formula (II-2)

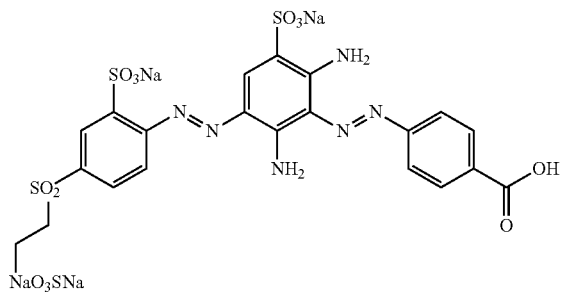

(II-2)

and mixed with 7 parts of a dye powder of the formula (IV-3)

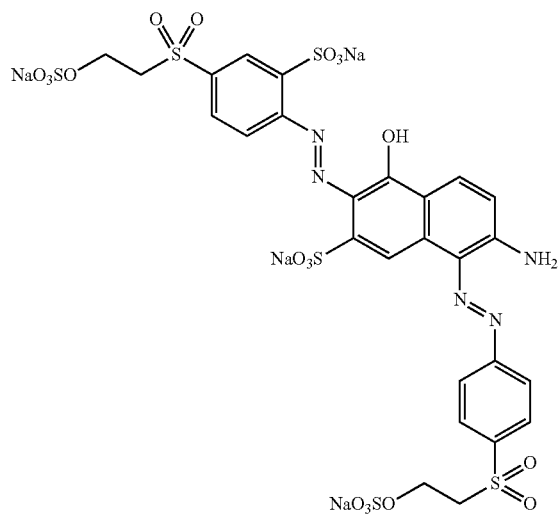

(IV-3)

The resulting dye mixture was dried under reduced pressure or can be dryed via spray drying and gives very deep black dyeings and prints, on cotton for example, under the dyeing conditions typical for reactive dyes.

Examples B4 to B53

The tabular examples herein below describe further inventive mixtures of the dyes of the general formulae (I)-(IV), each recited in the form of the sodium salts. The mixing proportions are indicated in percent by weight. The dye mixtures provide deep black dyeings and prints, on cotton for example, by the dyeing methods customary for reactive dyes.

Dye mixtures in accordance with Examples B1-B3 or without dyes of formula (IV).

All Radicals that are not defined in blow Table are equal to Hydrogen.

| Expl. | Dye of formula (I) | Dye of formula (II)/(III) | Dye of formula (IV) | Ratio (I):(II)/(III):(IV) |
|---|---|---|---|---|
| B4 | (A-1) | Formula (IIa) with: $R^{201}$: —$SO_3H$ $R^{200}$: —H $R^{105}$: —H $R^{107}$: —H | Formula (IVb) with: $R^{109}$: o-$SO_3Na$ $R^{111}$: —H $SO_2Z$: para Z: β-sulfatoethyl | 68:22:10 |
| B5 | (A-1) | Formula (IIa) with: $R^{201}$: —$SO_3Na$ $R^{200}$: —H $R^{106}$: —H $R^{108}$: p-COOH | Formula (IVb) with: $R^{110}$: o-$SO_3Na$ $R^{112}$: —H $SO_2Z$: para Z: β-sulfatoethyl G: p-$SO_2Z$; Z: β-sulfatoethyl $G_1$: p-$SO_2Z$; Z: β-sulfatoethyl | 65:23:12 |
| B6 | (A-1) | Formula (IIa) with: $R^{201}$: —$SO_3Na$ $R^{200}$: —H $R^{106}$: —H $R^{108}$: p-COOH | Formula (IVb) with: $R^{109}$: —H $R^{111}$: o-$SO_3Na$ $SO_2Z$: para Z: β-sulfatoethyl G: p-$SO_2Z$; Z: β-sulfatoethyl $G_1$: —H | 57:27:16 |
| B7 | (A-1) | Formula (IIa) with: $R^{201}$: —$SO_3Na$ $R^{200}$: —H $R^{106}$: —H $R^{108}$: p-COOH | Formula (IVb) with: $R^{110}$: o-$SO_3Na$ $R^{112}$: —H $SO_2Z$: para Z: β-sulfatoethyl G: m-$SO_2Z$; Z: β-sulfatoethyl $G_1$: —H | 61:23:16 |
| B8 | (A-1) | Formula (IIa) with: $R^{201}$: —$SO_3H$ $R^{200}$: —H $R^{105}$: —H $R^{107}$: p-COOH | Formula (IVb) with: $R^{109}$: o-$SO_3Na$ $R^{111}$: —H $SO_2Z$: para Z: β-sulfatoethyl G: m-$SO_2Z$; Z: β-sulfatoethyl $G_1$: —H | 72:18:10 |
| B9 | (A-1) | Formula (IIa) with: $R^{201}$: —COOH $R^{200}$: —H $R^{106}$: —H $R^{108}$: p-COOH | Formula (IVb) with: $R^{110}$: o-$SO_3Na$ $R^{112}$: o-$SO_3Na$ $SO_2Z$: para Z: β-sulfatoethyl G: p-$SO_2Z$; Z: β-sulfatoethyl $G_1$: —H | 70:15:15 |
| B10 | (A-1) | Formula (IIa) with: $R^{201}$: —$SO_3Na$ $R^{200}$: —H $R^{106}$: —H $R^{108}$: p-COOH | Formula (IVb) with: $R^{109}$: o-$SO_3Na$ $R^{111}$: o-$SO_3Na$ $SO_2Z$: para Z: β-sulfatoethyl G: p-$SO_2Z$; Z: β-sulfatoethyl $G_1$: —H | 70:20:10 |
| B11 | (A-1) | Formula (IIa) with: $R^{201}$: —$SO_3H$ $R^{200}$: —H $R^{105}$: —$SO_3H$ $R^{107}$: —$SO_3H$ | Formula (IVb) with: $R^{109}$: o-$SO_3Na$ $R^{111}$: —H $SO_2Z$: para Z: β-sulfatoethyl G: p-$SO_2Z$, Z: β-sulfatoethyl $G_1$: p-$SO_2Z$; Z: β-sulfatoethyl | 67:22:11 |
| B12 | (A-1) | Formula (IIa) with: $R^{201}$: —$SO_3H$ $R^{200}$: —H $R^{105}$: o-$SO_3Na$ $R^{107}$: —H | Formula (IVb) with: $R^{109}$: o-$SO_3Na$ $R^{111}$: o-$SO_3Na$ $SO_2Z$: para Z: β-sulfatoethyl G: p-$SO_2Z$, Z: β-sulfatoethyl $G_1$: p-$SO_2Z$; Z: β-sulfatoethyl | 68:18:14 |
| B13 | (A-1) | Formula (IIa) with: $R^{201}$: —$SO_3H$ $R^{200}$: —H $R^{105}$: o-$SO_3Na$ | Formula (IVb) with: $R^{109}$: o-$SO_3Na$ $R^{111}$: o-$SO_3Na$ $SO_2Z$: para | 66:22:12 |

-continued

| Expl. | Dye of formula (I) | Dye of formula (II)/(III) | Dye of formula (IV) | Ratio (I):(II)/(III):(IV) |
|---|---|---|---|---|
| | | $R^{107}$: o-SO$_3$Na<br>G: p-SO$_2$Z, Z: vinyl<br>$G_1$: p-SO$_2$Z; Z: vinyl | Z: β-vinyl | |
| B14 | (A-1) | Formula (IIa) with:<br>$R^{201}$: —SO$_3$Na<br>$R^{200}$: —CH$_3$<br>$R^{106}$: —H<br>$R^{108}$: p-COOH<br>G: p-SO$_2$Z; Z: β-sulfatoethyl<br>$G_1$: —H | Formula (IVb) with:<br>$R^{110}$: o-SO$_3$Na<br>$R^{112}$: —H<br>SO$_2$Z: para<br>Z: β-sulfatoethyl | 67:22:11 |
| B15 | (A-1) | Formula (IIa) with:<br>$R^{201}$: —SO$_3$Na<br>$R^{200}$: —CH$_3$<br>$R^{106}$: —H<br>$R^{108}$: p-COOH<br>G: p-SO$_2$Z; Z: β-sulfatoethyl<br>$G_1$: —H | Formula (IVb) with:<br>$R^{109}$: —H<br>$R^{111}$: o-SO$_3$Na<br>SO$_2$Z: para<br>Z: β-sulfatoethyl | 65:20:15 |
| B16 | (A-1) | Formula (IIa) with:<br>$R^{201}$: —SO$_3$Na<br>$R^{200}$: —CH$_3$<br>$R^{106}$: —H<br>$R^{108}$: —H<br>G: p-SO$_2$Z; Z: β-sulfatoethyl<br>$G_1$: p-SO$_2$Z; Z: β-sulfatoethyl | Formula (IVb) with:<br>$R^{109}$: —H<br>$R^{111}$: o-SO$_3$Na<br>SO$_2$Z: para<br>Z: β-sulfatoethyl | 66:18:16 |
| B17 | (A-1) | Formula (IIa) with:<br>$R^{201}$: —SO$_3$Na<br>$R^{200}$: —H<br>$R^{106}$: —H<br>$R^{108}$: —H<br>G: p-SO$_2$Z; Z: β-sulfatoethyl<br>$G_1$: p-SO$_2$Z; Z: β-sulfatoethyl | Formula (IVa) with:<br>$R^{110}$: o-SO$_3$Na<br>$R^{112}$: —H<br>SO$_2$Z: para<br>Z: β-sulfatoethyl<br>R*: CH$_3$ | 67:22:11 |
| B18 | (A-1) | Formula (IIa) with:<br>$R^{201}$: —SO$_3$Na<br>$R^{200}$: —H<br>$R^{106}$: —H<br>$R^{108}$: —H<br>G: p-SO$_2$Z; Z: β-sulfatoethyl<br>$G_1$: p-SO$_2$Z; Z: β-sulfatoethyl | Formula (IVa) with:<br>$R^{109}$: —H<br>$R^{111}$: o-SO$_3$Na<br>SO$_2$Z: para<br>Z: β-sulfatoethyl<br>R*: CH$_3$ | 65:22:13 |
| B19 | (A-1) | Formula (IIa) with:<br>$R^{201}$: —SO$_3$Na<br>$R^{200}$: —H<br>$R^{106}$: —H<br>$R^{108}$: p-COOH<br>G: p-SO$_2$Z; Z: β-sulfatoethyl<br>$G_1$: —H | Formula (IVa) with:<br>$R^{110}$: o-SO$_3$Na<br>$R^{112}$: —H<br>SO$_2$Z: para<br>Z: β-sulfatoethyl<br>R*: CH$_3$ | 68:20:12 |
| B20 | (A-1) | Formula (IIIa) with:<br>$R^{200}$: —H<br>$R^{105}$: —SO$_3$Na<br>$R^{107}$: —SO$_3$Na<br>G: p-SO$_2$Z<br>$G_1$: p-SO$_2$Z<br>Z: β-sulfatoethyl | Formula (IVb) with:<br>$R^{110}$: o-SO$_3$Na<br>$R^{112}$: —H<br>SO$_2$Z: para<br>Z: β-sulfatoethyl | 65:20:15 |
| B21 | (A-1) | Formula (IIIa) with:<br>$R^{200}$: —H<br>$R^{105}$: o-SO$_3$Na<br>$R^{107}$: o-SO$_3$Na<br>G: p-SO$_2$Z<br>$G_1$: p-SO$_2$Z<br>Z: β-sulfatoethyl | Formula (IVb) with:<br>$R^{109}$: —H<br>$R^{111}$: o-SO$_3$Na<br>SO$_2$Z: para<br>Z: β-sulfatoethyl | 70:20:10 |
| B22 | (A-1) | Formula (IIIa) with:<br>$R^{200}$: —H<br>$R^{105}$: o-SO$_3$Na<br>$R^{107}$: —H<br>G: p-SO$_2$Z<br>$G_1$: p-SO$_2$Z<br>Z: β-sulfatoethyl | Formula (IVb) with:<br>$R^{110}$: o-SO$_3$Na<br>$R^{112}$: —H<br>SO$_2$Z: para<br>Z: β-sulfatoethyl | 67:20:13 |
| B23 | (A-1) | Formula (IIIa) with:<br>$R^{200}$: —SO$_3$Na<br>$R^{105}$: —H<br>$R^{107}$: —H<br>G: p-SO$_2$Z<br>$G_1$: p-SO$_2$Z<br>Z: β-sulfatoethyl | Formula (IVb) with:<br>$R^{109}$: —H<br>$R^{111}$: o-SO$_3$Na<br>SO$_2$Z: para<br>Z: β-sulfatoethyl | 69:20:11 |
| B24 | (A-1) | Formula (IIIa) with:<br>$R^{200}$: —COOH<br>$R^{105}$: —H<br>$R^{107}$: —H<br>G: p-SO$_2$Z<br>$G_1$: p-SO$_2$Z<br>Z: β-sulfatoethyl | Formula (IVb) with:<br>$R^{109}$: —H<br>$R^{111}$: o-SO$_3$Na<br>SO$_2$Z: para<br>Z: β-sulfatoethyl | 64:20:16 |
| B25 | (A-1) | Formula (IIIa) with:<br>$R^{200}$: —CH$_3$<br>$R^{105}$: —H<br>$R^{107}$: —H<br>G: p-SO$_2$Z<br>$G_1$: p-SO$_2$Z<br>Z: β-sulfatoethyl | Formula (IVb) with:<br>$R^{109}$: o-SO$_3$Na<br>$R^{111}$: o-SO$_3$Na<br>SO$_2$Z: para<br>Z: β-sulfatoethyl | 65:18:17 |
| B26 | (A-1) | Formula (IIIa) with:<br>$R^{200}$: —CH$_3$<br>$R^{201}$: —CH$_3$<br>$R^{105}$: —H<br>$R^{107}$: —H<br>G: p-SO$_2$Z<br>$G_1$: p-SO$_2$Z<br>Z: β-sulfatoethyl | Formula (IVb) with:<br>$R^{109}$: —H<br>$R^{111}$: o-SO$_3$H<br>SO$_2$Z: para<br>Z: β-sulfatoethyl | 67:22:11 |
| B27 | (A-1) | Formula (IIIa) with:<br>$R^{200}$: —COOH<br>$R^{201}$: —CH$_3$<br>$R^{105}$: —H<br>$R^{107}$: —H<br>G: p-SO$_2$Z<br>$G_1$: p-SO$_2$Z<br>Z: β-sulfatoethyl | Formula (IVb) with:<br>$R^{109}$: —H<br>$R^{111}$: o-SO$_3$Na<br>SO$_2$Z: para<br>Z: β-sulfatoethyl | 68:21:11 |
| B28 | (A-1) | Formula (IIIa) with:<br>$R^{200}$: —SO$_3$Na<br>$R^{201}$: —CH$_3$<br>$R^{105}$: —H<br>$R^{107}$: —H<br>G: p-SO$_2$Z<br>$G_1$: p-SO$_2$Z<br>Z: β-sulfatoethyl | Formula (IVb) with:<br>$R^{109}$: —H<br>$R^{111}$: o-SO$_3$Na<br>SO$_2$Z: para<br>Z: β-sulfatoethyl | 68:20:12 |
| B29 | (A-2) | Formula (IIa) with:<br>$R^{201}$: —SO$_3$Na<br>$R^{200}$: —H<br>$R^{106}$: —H<br>$R^{108}$: p-COOH<br>G: p-SO$_2$Z; Z: β-sulfatoethyl<br>$G_1$: —H | Formula (IVb) with:<br>$R^{110}$: o-SO$_3$H<br>$R^{112}$: —H<br>SO$_2$Z: para<br>Z: β-sulfatoethyl | 65:18:17 |
| B30 | (A-2) | Formula (IIa) with:<br>$R^{201}$: —SO$_3$Na<br>$R^{200}$: —H<br>$R^{106}$: —H<br>$R^{108}$: p-COOH<br>G: p-SO$_2$Z; Z: β-sulfatoethyl<br>$G_1$: —H | Formula (IVb) with:<br>$R^{109}$: —H<br>$R^{111}$: o-SO$_3$H<br>SO$_2$Z: para<br>Z: β-sulfatoethyl | 70:15:15 |
| B31 | (A-2) | Formula (IIa) with:<br>$R^{201}$: —SO$_3$Na<br>$R^{200}$: —H<br>$R^{106}$: o-SO$_3$Na<br>$R^{108}$: —H<br>G: p-SO$_2$Z; Z: β-sulfatoethyl<br>$G_1$: p-SO$_2$Z; Z: β-sulfatoethyl | Formula (IVb) with:<br>$R^{109}$: —H<br>$R^{111}$: o-SO$_3$H<br>SO$_2$Z: para<br>Z: β-sulfatoethyl | 65:20:15 |
| B32 | (A-1) | Formula (IIa) with:<br>$R^{201}$: —SO$_3$Na | Formula (IVb) with:<br>$R^{110}$: o-SO$_3$Na | 64:18:18 |

-continued

| Expl. | Dye of formula (I) | Dye of formula (II)/(III) | Dye of formula (IV) | Ratio (I):(II)/(III):(IV) |
|---|---|---|---|---|
| | | $R^{200}$: —H<br>$R^{106}$: —H<br>$R^{108}$: p-$SO_3Na$<br>G: p-$SO_2Z$; Z: β-sulfatoethyl<br>$G_1$: —H | $R^{112}$: —H<br>$SO_2Z$: para<br>Z: β-sulfatoethyl | |
| B33 | (A-1) | Formula (IIa) with:<br>$R^{201}$: —$SO_3Na$<br>$R^{200}$: —H<br>$R^{106}$: —H<br>$R^{108}$: m-COOH<br>G: p-$SO_2Z$; Z: β-sulfatoethyl<br>$G_1$: —H | Formula (IVb) with:<br>$R^{109}$: —H<br>$R^{111}$: o-$SO_3Na$<br>$SO_2Z$: para<br>Z: β-sulfatoethyl | 75:10:15 |
| B34 | (A-3) | Formula (IIa) with:<br>$R^{201}$: —$SO_3Na$<br>$R^{200}$: —H<br>$R^{106}$: —H<br>$R^{108}$: p-COOH<br>G: p-$SO_2Z$; Z: β-sulfatoethyl<br>$G_1$: —H | Formula (IVb) with:<br>$R^{110}$: o-$SO_3H$<br>$R^{112}$: —H<br>$SO_2Z$: para<br>Z: β-sulfatoethyl | 70:15:15 |
| B35 | (A-3) | Formula (IIa) with:<br>$R^{201}$: —$SO_3Na$<br>$R^{200}$: —H<br>$R^{106}$: o-$SO_3Na$<br>$R^{108}$: —H<br>G: p-$SO_2Z$; Z: β-sulfatoethyl<br>$G_1$: p-$SO_2Z$; Z: β-sulfatoethyl | Formula (IVb) with:<br>$R^{109}$: —H<br>$R^{111}$: o-$SO_3H$<br>$SO_2Z$: para<br>Z: β-sulfatoethyl | 65:23:12 |
| B36 | (A-3) | Formula (IIa) with:<br>$R^{201}$: —$SO_3Na$<br>$R^{200}$: —H<br>$R^{106}$: —H<br>$R^{108}$: p-COOH<br>G: p-$SO_2Z$; Z: β-sulfatoethyl<br>$G_1$: —H | Formula (IVb) with:<br>$R^{109}$: —H<br>$R^{111}$: o-$SO_3H$<br>$SO_2Z$: para<br>Z: β-sulfatoethyl | 64:24:12 |
| B37 | (A-4) | Formula (IIa) with:<br>$R^{201}$: —$SO_3Na$<br>$R^{200}$: —H<br>$R^{106}$: —H<br>$R^{108}$: p-COOH<br>G: p-$SO_2Z$; Z: β-sulfatoethyl<br>$G_1$: —H | Formula (IVb) with:<br>$R^{110}$: o-$SO_3H$<br>$R^{112}$: —H<br>$SO_2Z$: para<br>Z: β-sulfatoethyl | 65:20:15 |
| B38 | (A-4) | Formula (IIa) with:<br>$R^{201}$: —$SO_3Na$<br>$R^{200}$: —H<br>$R^{106}$: —H<br>$R^{108}$: p-COOH<br>G: p-$SO_2Z$; Z: β-sulfatoethyl<br>$G_1$: —H | Formula (IVb) with:<br>$R^{109}$: —H<br>$R^{111}$: o-$SO_3H$<br>$SO_2Z$: para<br>Z: β-sulfatoethyl | 64:22:14 |
| B39 | (A-4) | Formula (IIa) with:<br>$R^{201}$: —$SO_3Na$<br>$R^{200}$: —H<br>$R^{106}$: o-$SO_3Na$<br>$R^{108}$: —H<br>G: p-$SO_2Z$; Z: β-sulfatoethyl<br>$G_1$: p-$SO_2Z$; Z: β-sulfatoethyl | Formula (IVb) with:<br>$R^{110}$: o-$SO_3Na$<br>$R^{112}$: —H<br>$SO_2Z$: para<br>Z: β-sulfatoethyl | |
| B40 | (A-1) | Formula (IIa) with:<br>$R^{201}$: —$SO_3Na$<br>$R^{200}$: —H<br>$R^{106}$: —H<br>$R^{108}$: p-COOH<br>G: p-$SO_2Z$; Z: β-sulfatoethyl<br>$G_1$: —H | | 70:30:0 |
| B41 | (A-1) | Formula (IIa) with:<br>$R^{201}$: —$SO_3Na$<br>$R^{200}$: —H<br>$R^{105}$: o-$SO_3Na$<br>$R^{107}$: —H<br>G: p-$SO_2Z$, Z: β-sulfatoethyl<br>G1: p-$SO_2Z$; Z: β-sulfatoethyl | | 67:33:0 |
| B42 | (A-1) | Formula (IIa) with:<br>$R^{201}$: —H<br>$R^{200}$: —COOH<br>$R^{105}$: o-$SO_3Na$<br>$R^{107}$: —H<br>G: p-$SO_2Z$, Z: β-sulfatoethyl<br>G1: p-$SO_2Z$; Z: β-sulfatoethyl | | 68:32:0 |
| B43 | (A-1) | Formula (IIa) with:<br>$R^{201}$: —$SO_3H$<br>$R^{200}$: —H<br>$R^{105}$: o-$SO_3Na$<br>$R^{107}$: o-$SO_3Na$<br>G: p-$SO_2Z$, Z; vinyl<br>G1: p-$SO_2Z$; Z: vinyl | | 66:34:0 |
| B45 | (A-1) | Formula (IIa) with:<br>$R^{201}$: —$SO_3Na$<br>$R^{200}$: —$CH_3$<br>$R^{106}$: —H<br>$R^{108}$: —H<br>G: p-$SO_2Z$; Z: β-sulfatoethyl<br>G1: p-$SO_2Z$; Z: β-sulfatoethyl | | 66:34:0 |
| B46 | (A-1) | Formula (IIa) with:<br>$R^{201}$: —$SO_3Na$<br>$R^{200}$: —H<br>$R^{106}$: —H<br>$R^{108}$: —H<br>G: p-$SO_2Z$; Z: β-sulfatoethyl<br>G1: p-$SO_2Z$; Z: β-sulfatoethyl | | 62:38:0 |
| B47 | (A-1) | Formula (IIIa) with:<br>$R^{200}$: —H<br>$R^{105}$: o-$SO_3Na$<br>$R^{107}$: o-$SO_3Na$<br>G: p-$SO_2Z$<br>G1: p-$SO_2Z$<br>Z: β-sulfatoethyl | | 65:35:0 |
| B48 | (A-1) | Formula (IIIa) with:<br>$R^{200}$: —COOH<br>$R^{105}$: —H<br>$R^{107}$: —H<br>G: p-$SO_2Z$<br>G1: p-$SO_2Z$<br>Z: β-sulfatoethyl | | 64:36:0 |
| B49 | (A-1) | Formula (IIIa) with:<br>$R^{200}$: —$CH_3$<br>$R^{105}$: —H<br>$R^{107}$: —H<br>G: p-$SO_2Z$<br>G1: p-$SO_2Z$<br>Z: β-sulfatoethyl | | 65:35:0 |
| B50 | (A-1) | Formula (IIa) with:<br>$R^{201}$: —$SO_3Na$<br>$R^{200}$: —H<br>$R^{106}$: —H<br>$R^{108}$: p-COOH | Formula (IV) with:<br>D4: formula (1) with<br>X: m-$SO_2Z$<br>Z: β-sulfatoethyl<br>and $R^1$: o-methoxy | 63:27:10 |

-continued

| Expl. | Dye of formula (I) | Dye of formula (II)/(III) | Dye of formula (IV) | Ratio (I):(II)/ (III):(IV) |
|---|---|---|---|---|
| | | G: p-SO$_2$Z; Z: β-sulfatoethyl<br>G$_1$: —H | D3: formula (1) with<br>X: p-SO$_2$Z<br>Z: β-sulfatoethyl<br>and R$^1$: o-SO$_3$Na<br>R*: —CH$_2$SO$_3$Na | |
| B51 | (A-1) | Formula (IIa) with:<br>R$^{201}$: —SO$_3$Na<br>R$^{200}$: —H<br>R$^{106}$: —H<br>R$^{108}$: p-COOH<br>G: p-SO$_2$Z; Z: β-sulfatoethyl<br>G$_1$: —H | Formula (IV) with:<br>D4: formula (1) with<br>X: p-SO$_2$Z<br>Z: β-sulfatoethyl<br>D3 = formula (1) with<br>X: p-SO$_2$Z<br>R1: o-SO$_3$Na<br>Z: β-sulfatoethyl<br>R*: —CH$_2$SO$_3$Na | 58:20:22 |
| B52 | (A-1) | Formula (IIa) with:<br>R$^{201}$: —SO$_3$Na<br>R$^{200}$: —H<br>R$^{105}$: o-SO$_3$Na<br>R$^{107}$: —H<br>G: p-SO$_2$Z, Z: β-sulfatoethyl<br>G$_1$: p-SO$_2$Z; Z: β-sulfatoethyl | Formula (IV) with:<br>D4: formula (1) with<br>X: p-SO$_2$Z<br>Z: β-sulfatoethyl<br>D3: formula (1) with<br>X: p-SO$_2$Z<br>Z: β-sulfatoethyl<br>R*: —CH$_2$SO$_3$Na | 62:22:16 |
| B53 | (A-1) | Formula (IIa) with:<br>R$^{201}$: —SO$_3$Na<br>R$^{200}$: —H<br>R$^{106}$: —H<br>R$^{108}$: —H<br>G: p-SO$_2$Z; Z: β-sulfatoethyl<br>G$_1$: p-SO$_2$Z; Z: β-sulfatoethyl | Formula (IV) with:<br>D4: formula (1) with<br>X: p-SO$_2$Z<br>Z: β-sulfatoethyl<br>D3: formula (1) with<br>X: p-SO$_2$Z<br>Z: β-sulfatoethyl<br>R*: —CH$_2$SO$_3$Na | 67:22:11 |

Example B 54

60 parts of a dye of formula (A-1)

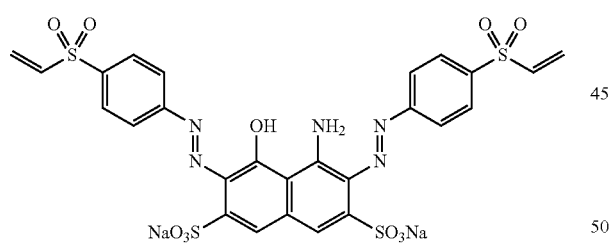

(A-1)

were mixed with 13 parts of a dye of formula (II-1)

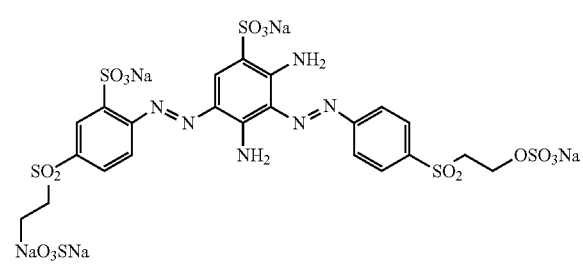

(II-1)

and mixed with 12 parts of a dye of the formula (III-1)

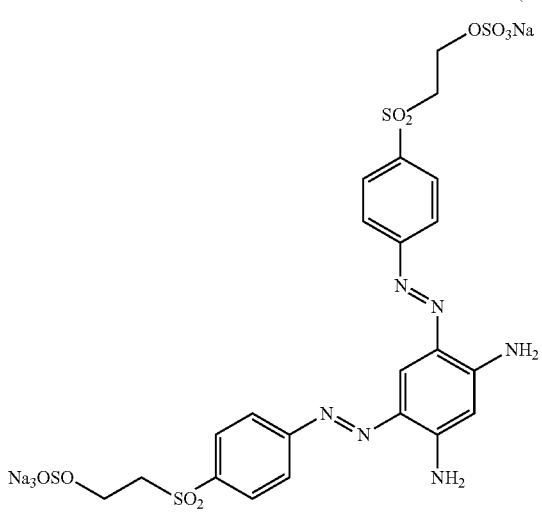

(III-1)

and mixed with 15 parts of a dye powder of the formula (IV-1)

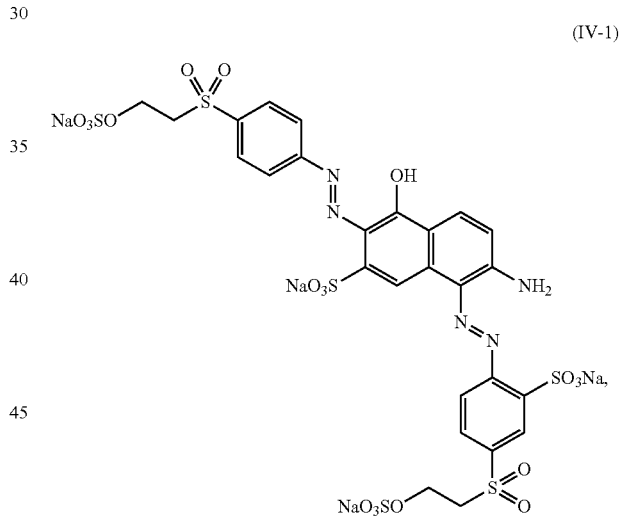

(IV-1)

The resulting inventive dye mixture was dried under reduced pressure. (Alternatively it could be dried via spray drying.) It gives very deep black dyeings and prints, e.g. on cotton, under the dyeing conditions typical for reactive dyes.

Performance-Examples C1 to C2

C1

The dye from example A1 of this invention was compared with the corresponding non-inventive dye (Ia) wherein D$^1$ and D$^2$ is p-Sulfatoethyl sulfonyl-anilin:

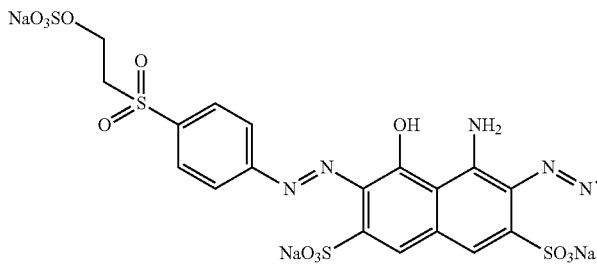

Remazol® Black B 133%, in exhaust dyeing (liquor ratio 1:10, soda ash 20 g/l, 70 g/l NaCl, unbleached cotton knit) at 40° C., 50° C. and 60° C.

The resulting color strengths (in %) were measured in a full black relative to dyeings performed at 60° C.:

|  | Temperature in ° C. | | |
| --- | --- | --- | --- |
|  | 40 | 50 | 60 |
| Sample from A1 | 95.7 | 99.9 | 100 |
| Remazol ® Black B 133% | 90.8 | 102 | 100 |

It can be seen clearly that the product from example A1 has a significant lower sensibility to variations in the temperature during the dying process, which makes the dying process much more predictable and allows for more temperature variability in the dyeing process when using the inventive dye mixture as compared to known mixtures.

C2

Inventive new dye mixtures Remazol® Midnight Black RGB and Remazol® Onyx RGB wer dyed on cotton knit with a liqueur ratio 10:1, at 60° C., Soda ash 5 g/l, caustic soda 50% 2 ml/l, 80 g/l Salt (NaCl) and their colour strength in a deep black shade was set to be 100%.

Then cotton knit was dyed using the same dying conditions but using the non-inventive state of the art deep black dyes listed below.

Their colour strength relative to the inventive products is:

Novacron Black WAE=90%

Bezaktiv® Cosmos S-MAX=95%

Remazol® Deep Black RGB=92%

Jakazol® Black JNN=95%

Novacron Black CNN=95%

It can be seen from C2 that the colour strength of a dye mixture according to the present invention is even higher than that of state of the art products. The combination with the high temperature tolerance during the dying process as shown in C1 allows the dyer more freedom in performing the process and reduces the amounts of dye required to achieve the same dyeing result as with other dyes.

The invention claimed is:
1. A dye mixture comprising
one or more dye(s) of formula (I)

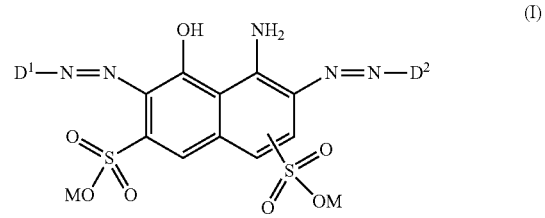

and
one or more dye(s) of formula (II) and/or formula (III)

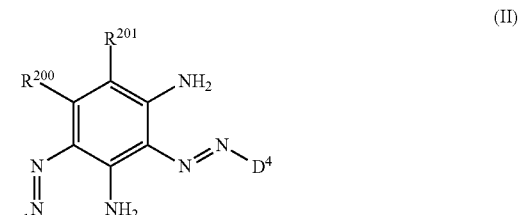

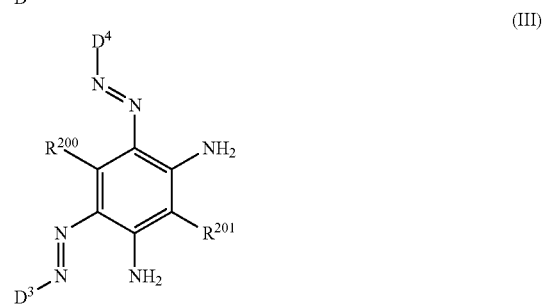

and optionally
one or more dye(s) of: formula (IV)

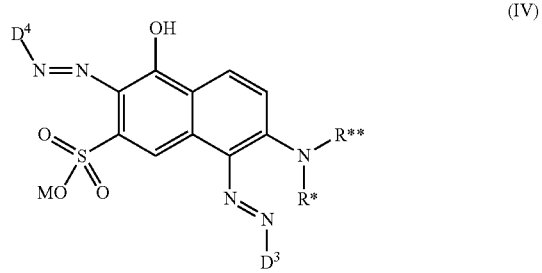

wherein D¹ and D² independent of one another is group of formula (1)

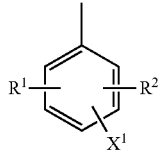

wherein
R¹ and R² independent of one another is hydrogen, $(C_1\text{-}C_4)$-alkyl, $(C_1\text{-}C_4)$-alkoxy, sulfo, carboxyl, amido or ureido,
X¹ is hydrogen or $-SO_2-CH=CH_2$,
D³ and D⁴ independent of one another is a group of formula (1)
wherein
R¹ and R² independent of one another is hydrogen, $(C_1\text{-}C_4)$-alkyl, $(C_1\text{-}C_4)$-alkoxy, sulfo, carboxyl, amido or ureido,
X¹ is hydrogen or a group of the formula: $-SO_2-Z$, wherein
Z is hydroxyl, $-CH=CH_2$ or $-CH_2CH_2Z^1$, wherein Z¹ is hydroxyl or a group which can be eliminated under the action of alkali,
$R^{200}$ and $R^{201}$ independent of one another is
i) hydrogen,
ii) $C_1\text{-}C_6$-alkyl, which is linear or branched and is unsubstituted or substituted by amino, $(C_1\text{-}C_4)$-alkylamino, hydroxyl, $(C_1\text{-}C_4)$-alkoxy, sulfo, halogen, carboxyl, acetamido or ureido;
iii) phenyl which is unsubstituted or substituted by $(C_1\text{-}C_4)$-alkyl, $(C_1\text{-}C_4)$-alkoxy, sulfo, halogen, carboxyl, acetamido or ureido;
(iv) amino, $(C_1\text{-}C_4)$-alkylamino, hydroxyl, $(C_1\text{-}C_4)$-alkoxy, sulfo, carboxyl, cyano, halogen, nitro, amido or ureido,
R* and R** independent of one another is hydrogen, $(C_1\text{-}C_4)$-alkyl, $CO\text{-}(C_1\text{-}C_4\text{-alkyl})$ or $-CH_2-SO_3M$,
M is hydrogen, an alkali metal or one equivalent of an alkaline earth metal
and wherein the sum of weights of all dyes of formula (I) that are present in the dye mixture is at least 40% of the weight of the dye mixture —calculated on the basis of the sum of weights of all dyes according to formulae (I), (II), (III) and (IV) that are present in the dye mixture.

2. The dye mixture according to claim 1, wherein one or more dye(s) of formula (I) to (IV) independent from each other is/are:

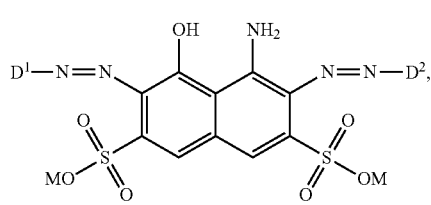

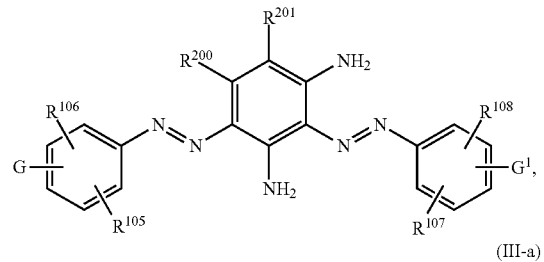

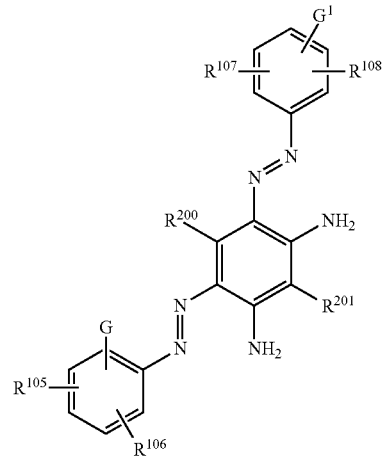

and/or

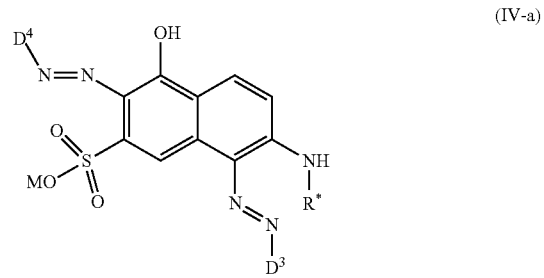

wherein D¹ to D⁴ and R* are as defined in claim 1 and
$R^{105\ 108}$ independent of one another is hydrogen, $C_1\text{-}C_4$-alkyl, $C_1\text{-}C_4$-alkoxy, sulfo, carboxy, $-CN$, $-COOR^1$ or $-CONR^2R^3$, wherein
R¹ is M or $(C_1\text{-}C_4)$-alkyl,
R² and R³ independent of one another is H or $(C_1\text{-}C_4)$-alkyl,
$R^{200}$ and $R^{201}$ independent of one another is hydroxyl, $(C_1\text{-}C_4)$-alkoxy, sulfo, halogen, carboxyl, acetamido, ureido, amino, $(C_1\text{-}C_4)$-alkylamino or phenyl, which phenyl is unsubstituted or substituted by a substituent selected from the group consisting of $(C_1\text{-}C_4)$-alkyl, $(C_1\text{-}C_4)$-alkoxy, sulfo, halogen, carboxyl, acetamido and ureido,
G and G¹ is $SO_2Z$ or hydrogen, with the proviso that not both G and G1 are hydrogen,
Z is vinyl, β-sulfatoethyl or hydroxyl and
M is hydrogen, an alkali metal or one equivalent of an alkaline earth metal.

3. The dye mixture according to claim 1, wherein one or more dye(s) of formula (I) to (IV) independent from each other is:

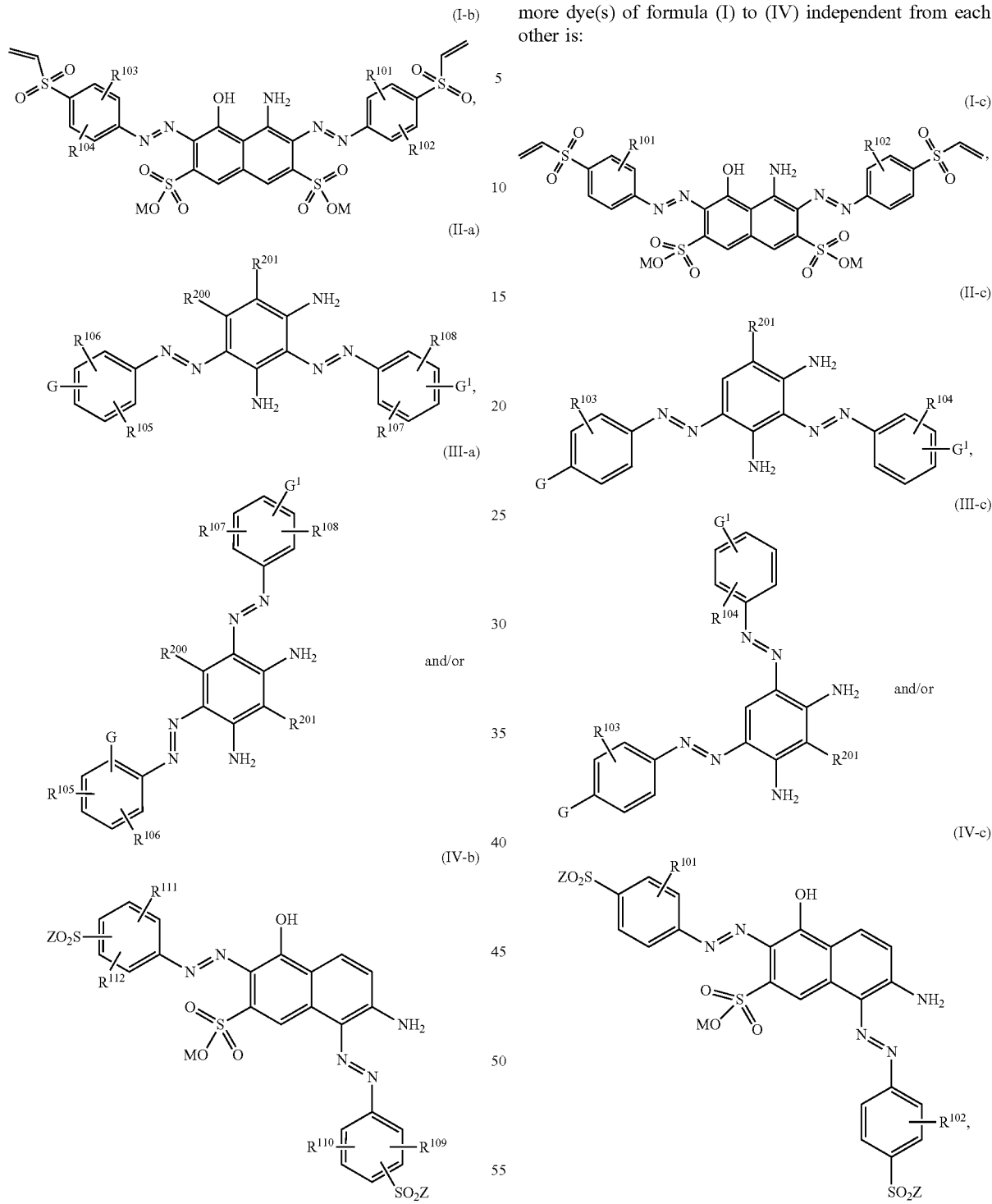

4. The dye mixture according to claim 1, wherein one or more dye(s) of formula (I) to (IV) independent from each other is:

wherein
R$^{101}$ R$^{112}$ independent of one another is hydrogen, carboxy, sulfo, (C$_1$-C$_4$)-alkyl or (C$_1$-C$_4$)-alkoxy,
R$^{200}$ and R$^{201}$ independent of one another is hydrogen, carboxy, sulfo or amino,
G and G$^1$ are SO$_2$Z or hydrogen with the proviso that not both G and G1 are hydrogen,
Z is vinyl, β-sulfatoethyl or hydroxyl and
M is hydrogen or an alkali metal.

wherein
R$^{101}$ and R$^{102}$ independent of one another is hydrogen or sulfo,
R$^{103}$ and R$^{104}$ independent of one another is hydrogen, sulfo or carboxy,
R$^{201}$ is hydrogen or sulfo,
G and G$^1$ is SO$_2$Z or hydrogen with the proviso that not both G and G1 are hydrogen,
Z is vinyl, β-sulfatoethyl or hydroxyl and
M is hydrogen or an alkali metal.

5. An ink comprising the dye mixture according to claim 1.

6. A process for dyeing or printing hydroxyl- and/or carboxamido-containing material which comprises contacting the material with the dye mixture according to claim 1.

7. A bound fiber comprising a fiber and the dye mixture according to claim 1 in chemically and/or physically bound form wherein the fiber is selected from the group consisting of synthetic fiber materials, nylon materials, nylon-6, nylon-6.6, aramid fiber, vegetable fiber, seed fiber, cotton, organic cotton, kapok, coir from coconut husk, bast fiber, flax, hemp, jute, kenaf, ramie, rattan, leaf fiber, sisal, henequen, banana, stalk fiber, bamboo, fiber from animals, wool, organic wool, silk, cashmere wool, alpaca fiber, mohair, Angora fiber, fur, leather materials; manufactured, regenerated and recycled fiber, cellulosic fiber, paper fiber, cellulosic regenerated fiber, viscose rayon fiber, acetate and triacetate fiber and Lyocell fiber.

8. A blend comprising a fiber and the dye mixture according to claim 1 in chemically and/or physically bound form wherein the fiber is selected from the group consisting of synthetic fiber materials, nylon materials, nylon-6, nylon-6.6, aramid fiber, vegetable fiber, seed fiber, cotton, organic cotton, kapok, coir from coconut husk, bast fiber, flax, hemp, jute, kenaf, ramie, rattan, leaf fiber, sisal, henequen, banana, stalk fiber, bamboo, fiber from animals, wool, organic wool, silk, cashmere wool, alpaca fiber, mohair, Angora fiber, fur, leather materials; manufactured, regenerated and recycled fiber, cellulosic fiber, paper fiber, cellulosic regenerated fiber, viscose rayon fiber, acetate and triacetate fiber and Lyocell fiber.

\* \* \* \* \*